(12) United States Patent
Malladi et al.

(10) Patent No.: US 9,131,351 B2
(45) Date of Patent: Sep. 8, 2015

(54) APPARATUS AND METHODS OF MBMS SUPPORT IN NEW CARRIER TYPE IN LTE

(71) Applicant: QUALCOMM Incorporated, San Diego, CA (US)

(72) Inventors: Durga Prasad Malladi, San Diego, CA (US); Peter Gaal, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 121 days.

(21) Appl. No.: 13/797,543

(22) Filed: Mar. 12, 2013

(65) Prior Publication Data

US 2013/0294317 A1 Nov. 7, 2013

Related U.S. Application Data

(60) Provisional application No. 61/642,334, filed on May 3, 2012, provisional application No. 61/734,311, filed on Dec. 6, 2012.

(51) Int. Cl.
| | |
|---|---|
| *H04W 4/06* | (2009.01) |
| *H04W 72/00* | (2009.01) |
| *H04W 72/12* | (2009.01) |
| *H04W 72/04* | (2009.01) |

(52) U.S. Cl.
CPC ............ *H04W 4/06* (2013.01); *H04W 72/005* (2013.01); *H04W 72/0446* (2013.01); *H04W 72/0453* (2013.01); *H04W 72/1278* (2013.01)

(58) Field of Classification Search
USPC ......... 370/312, 315, 294, 328, 329, 330, 336, 370/347
See application file for complete search history.

(56) References Cited

U.S. PATENT DOCUMENTS

| | | | | |
|---|---|---|---|---|
| 2008/0267317 | A1* | 10/2008 | Malladi ........................ | 375/299 |
| 2009/0252077 | A1* | 10/2009 | Khandekar et al. ........... | 370/312 |

(Continued)

FOREIGN PATENT DOCUMENTS

| | | | |
|---|---|---|---|
| EP | 2293605 A1 | | 3/2011 |
| WO | WO 2011044290 A1 | * | 4/2011 |

(Continued)

OTHER PUBLICATIONS

Apple Inc: "Multiplexing of ePDCCH with PDCCH and PDSCH", 3GPP Draft; R1-120273, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, Feb. 1, 2012, XP050563183, [retrieved on Feb. 1, 2012].

(Continued)

*Primary Examiner* — Edan Orgad
*Assistant Examiner* — Saumit Shah
(74) *Attorney, Agent, or Firm* — Arent Fox LLP

(57) ABSTRACT

Methods and apparatus of supporting multi-media broadcast services in a wireless communication system include generating a carrier capable of carrying data traffic including broadcast data and unicast data, wherein the carrier comprises a carrier type that is non-backward compatible with existing carriers. Aspects of the methods and apparatus include transmitting broadcast data in at least one subframe of a plurality of subframes. Aspects also include providing control information at least for unicast data associated with the at least one subframe and transmitting the carrier.

88 Claims, 15 Drawing Sheets

(56) References Cited

U.S. PATENT DOCUMENTS

| | | |
|---|---|---|
| 2010/0272017 A1 | 10/2010 | Terry et al. |
| 2011/0053490 A1 | 3/2011 | Wu |
| 2011/0081913 A1* | 4/2011 | Lee et al. .................. 455/450 |
| 2011/0243056 A1 | 10/2011 | Jen |
| 2012/0039229 A1 | 2/2012 | Etemad et al. |
| 2012/0213141 A1 | 8/2012 | Damnjanovic |
| 2014/0153472 A1* | 6/2014 | Phan et al. ................. 370/312 |

FOREIGN PATENT DOCUMENTS

| | | |
|---|---|---|
| WO | 2012010895 A1 | 1/2012 |
| WO | 2012115726 A1 | 8/2012 |
| WO | 2013025547 A2 | 2/2013 |

OTHER PUBLICATIONS

CATT: "Considerations on E-PDCCH multiplexing with PDSCH", 3GPP Draft; R1-120110, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, Jan. 31, 2012, XP050562690, [retrieved on Jan. 31, 2012].

Fujitsu: "Cross-subframe scheduling by E-PDCCH", 3GPP Draft; R1-120759, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, Feb. 2, 2012, XP050563340, [retrieved on Feb. 2, 2012].

HTC: "E-PDCCH Design Considerations on Multiplexing with PDSCH", 3GPP Draft; R1-120266, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, Feb. 1, 2012, XP050563176, [retrieved on Feb. 1, 2012].

Huawei (Rapporteur): "Stage-3 CR for MBMS enhancement", 3GPP Draft; R2-106882 36331 CR0492_(REL-10) Stage-3 CR for MBMS Enhancement, 3rd Generation Partnership Project (3GPP), Mobile Competence Centre ; 650, Route Des Lucioles ; F-06921 Sophia-Antipolis Cedex ; France, vol. RAN WG2, no. Jacksonville, USA; Nov. 15, 2010, Nov. 19, 2010, XP050470690, [retrieved on Nov. 19, 2010].

International Search Report and Written Opinion—PCT/US2013/030853—ISA/EPO—May 24, 2013.

NEC Group: "Design consideration for additional carrier type", 3GPP Draft; R1-120249, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, Jan. 31, 2012, XP050562804, [retrieved on Jan. 31, 2012].

Nokia et al., "Control channel regions for E-PDCCH", 3GPP Draft; R1-120733 Control Channel Regions for E-PDCCH, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Feb. 6, 2012-Feb. 10, 2012, Jan. 31, 2012, XP050563115, [retrieved on Jan. 31, 2012].

QUALCOMM Incorporated: "Resource Allocation Methods for NCT", 3GPP Draft; R1-122876 Resource Allocation Methods for NCT, 3rd Generation Partnership Project (3GPP), Mobile Competence Centre ; 650, Route Des Lucioles ; F-06921 Sophia-Antipolis Cedex ; France, vol. RAN WG1, no. Prague; May 21, 2012-May 25, 2012, May 16, 2012, XP050601132, [retrieved on May 16, 2012].

* cited by examiner

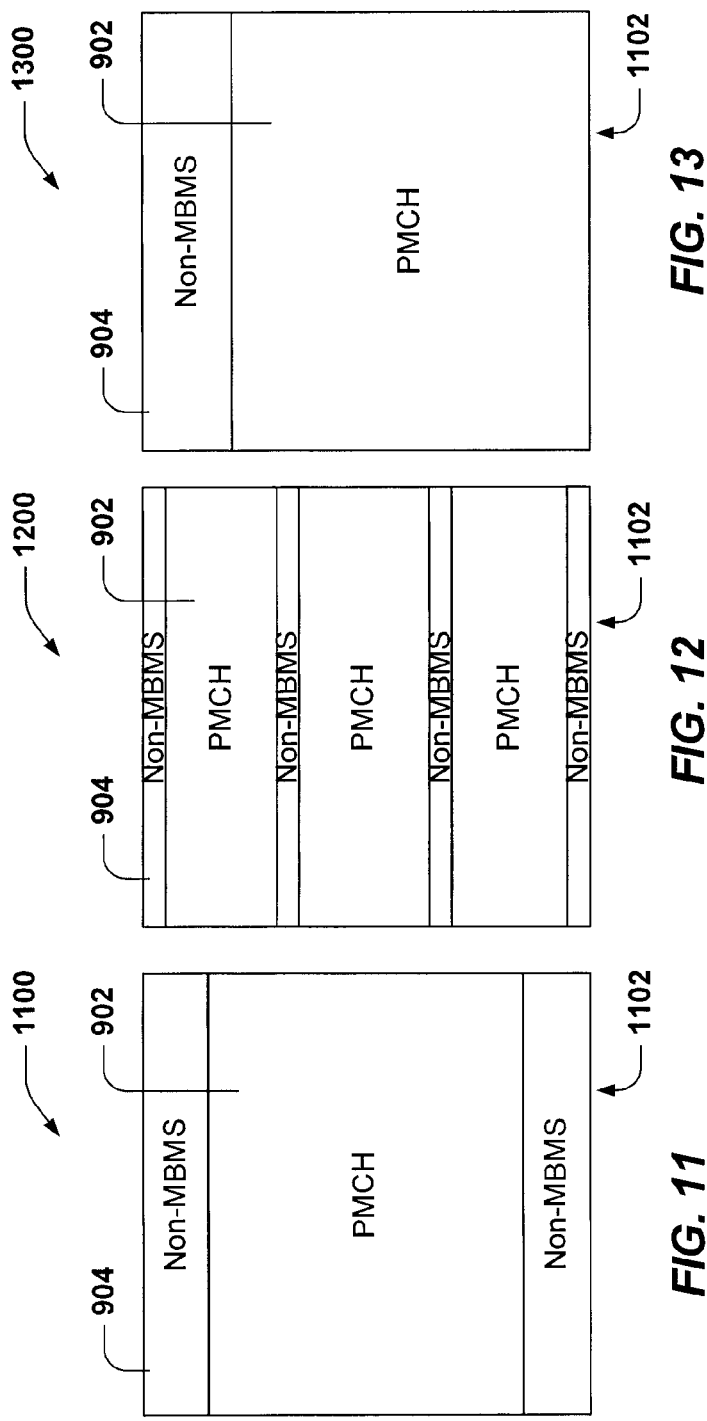

APPARATUS AND METHODS OF MBMS SUPPORT IN NEW CARRIER TYPE IN LTE

CLAIM OF PRIORITY UNDER 35 U.S.C. §119

The present application for patent claims priority to Provisional Application No. 61/642,334 entitled "Apparatus and Methods of MBMS Support in New Carrier Type in LTE" filed May 3, 2012, and Provisional Application No. 61/734,311 entitled "Apparatus and Methods of MBMS Support in New Carrier Type in LTE" filed Dec. 6, 2012, and assigned to the assignee hereof and hereby expressly incorporated by reference herein.

BACKGROUND

1. Field

Aspects of the present disclosure relate generally to wireless communication systems, and more particularly, to supporting Multimedia Broadcast/Multicast Service (MBMS) in a new carrier type, such as an extension carrier, in LTE.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. In an example, a base station can assign a number of downlink and/or uplink resources to a UE. Moreover, the base station can allow the UE to establish multiple carriers for communicating with the base station over the downlink or uplink using multiple physical or virtual antennas or other radio resources to improve communication throughput.

In some systems, the base station may provide multi-media service and a unicast service to UEs. For instance, such as service includes Multimedia Broadcast/Multicast Service (MBMS). In MBMS, a plurality of subframes, e.g. Multicast/Broadcast over Single Frequency Network (MBSFN) subframes, of a radio frame may be allocated to support broadcast and/or unicast service. Further, the radio frame may be part of a set of radio frames that repeats over a transmission interval to deliver the service. In current implementations of MBMS, the MBSFN subframes can be configured with a non-MBMS region for providing control information, and an MBMS region for carrying data traffic. In particular, in current implementations, the non-MBMS region of a subframe may include the first several OFDM symbols, and thus the MBMS region is defined as the OFDM symbols not used for the non-MBMS region.

Problematically, however, a new carrier type, defined in LTE Release 12 (Rel-12) and also referred to as an extension carrier, may contain an enhanced control channel spanning at least the MBMS region (and possibly also spanning the non-MBMS region, if there is no legacy non-MBMS region), e.g. the data traffic region, of a MBSFN subframe.

Accordingly, mechanisms for supporting broadcast and unicast services are desired for an LTE new carrier type.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of supporting multi-media broadcast services in a wireless communication system is provided. The method includes generating a carrier capable of carrying data traffic including broadcast data and unicast data, wherein the carrier comprises a carrier type that is non-backward compatible with existing carriers. Further the method includes transmitting broadcast data in at least one subframe of a plurality of subframes. Additionally the method includes providing control information at least for unicast data associated with the at least one subframe and transmitting the carrier.

A apparatus for supporting multi-media broadcast services in a wireless communication system is provided. The apparatus includes processor configured to generate a carrier capable of carrying data traffic including broadcast data and unicast data, wherein the carrier comprises a carrier type that is non-backward compatible with existing carriers. Further, the processor is configured to transmit broadcast data in at least one subframe of a plurality of subframes. Additionally, the processor is configured to provide control information at least for unicast data associated with the at least one subframe and transmit the carrier.

In another aspect, a computer-readable media that may include machine-executable code for generating a carrier capable of carrying data traffic including broadcast data and unicast data, wherein the carrier comprises a carrier type that is non-backward compatible with existing carriers. The code may be executable for transmitting broadcast data in at least one subframe of a plurality of subframes. Further, the code may be executable for providing control information at least for unicast data associated with the at least one subframe and transmitting the carrier.

In yet another aspect, an apparatus for supporting multi-media broadcast services in a wireless communication system includes means for generating a carrier capable of carrying data traffic including broadcast data and unicast data, wherein the carrier comprises a carrier type that is non-backward compatible with existing carriers. The apparatus includes means for transmitting broadcast data in at least one subframe of a plurality of subframes. Further, the apparatus includes means for providing control information at least for unicast data associated with the at least one subframe and means for transmitting the carrier.

These and other aspects of the disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 11 is a block diagram of an aspect of a FDM-based mixing of MBMS and non-MBMS resources within an MBSFN subframe;

FIG. 12 is a block diagram of another aspect of a FDM-based mixing of MBMS and non-MBMS resources within an MBSFN subframe;

FIG. 13 is a block diagram of yet another aspect of a FDM-based mixing of MBMS and non-MBMS resources within an MBSFN subframe;

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
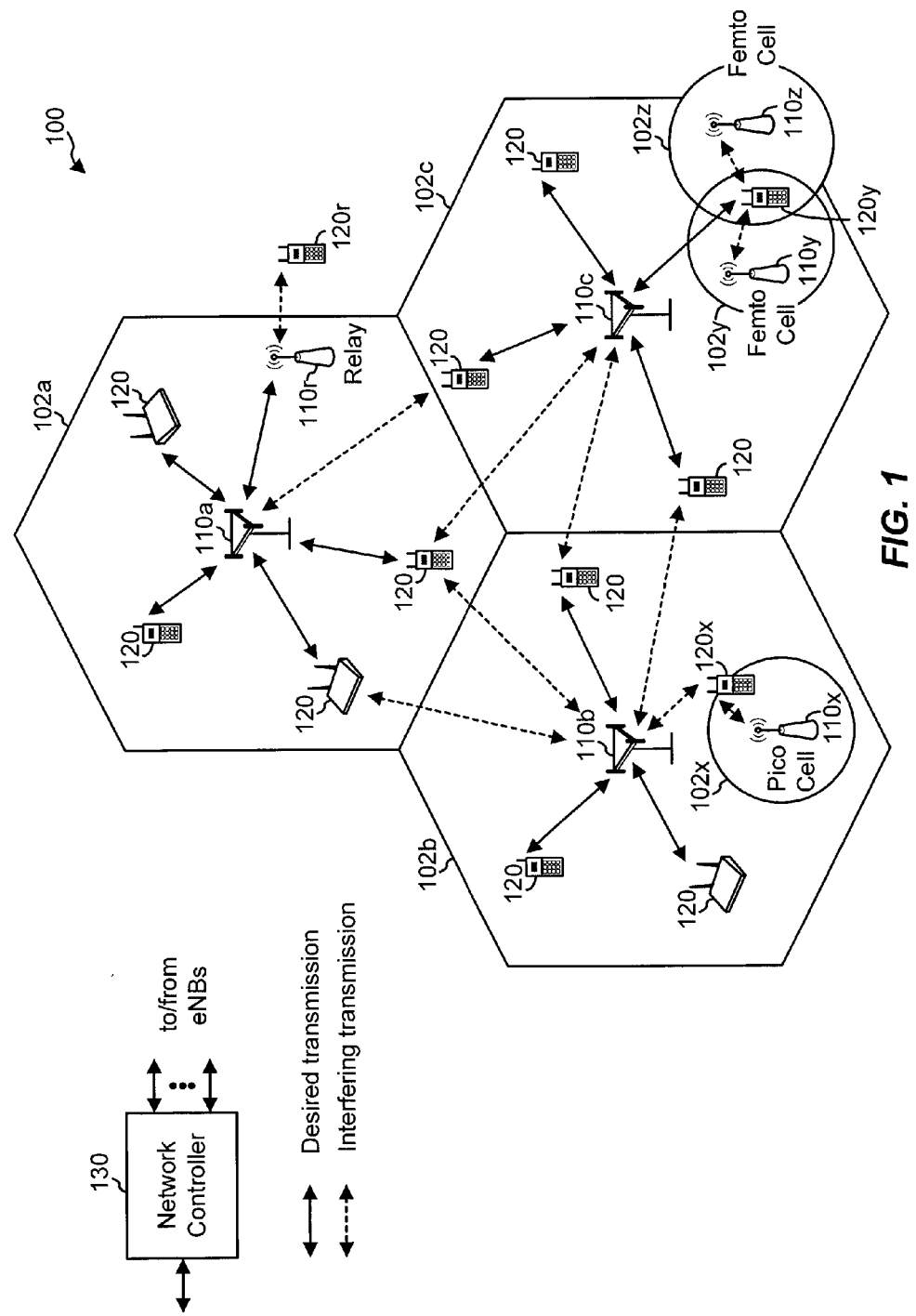
FIG. 1 is a block diagram conceptually illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the user equipments (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a device, a terminal, a mobile station, a subscriber unit, a station, etc. A UE may be a cellular phone, a smart phone, a personal digital assistant (PDA), a wireless modem (or other tethered device), a wireless communication device, a handheld device, a laptop computer, a tablet or netbook computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM or a similar multiplexing scheme and in the time domain with SC-FDM or a similar multiplexing scheme. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
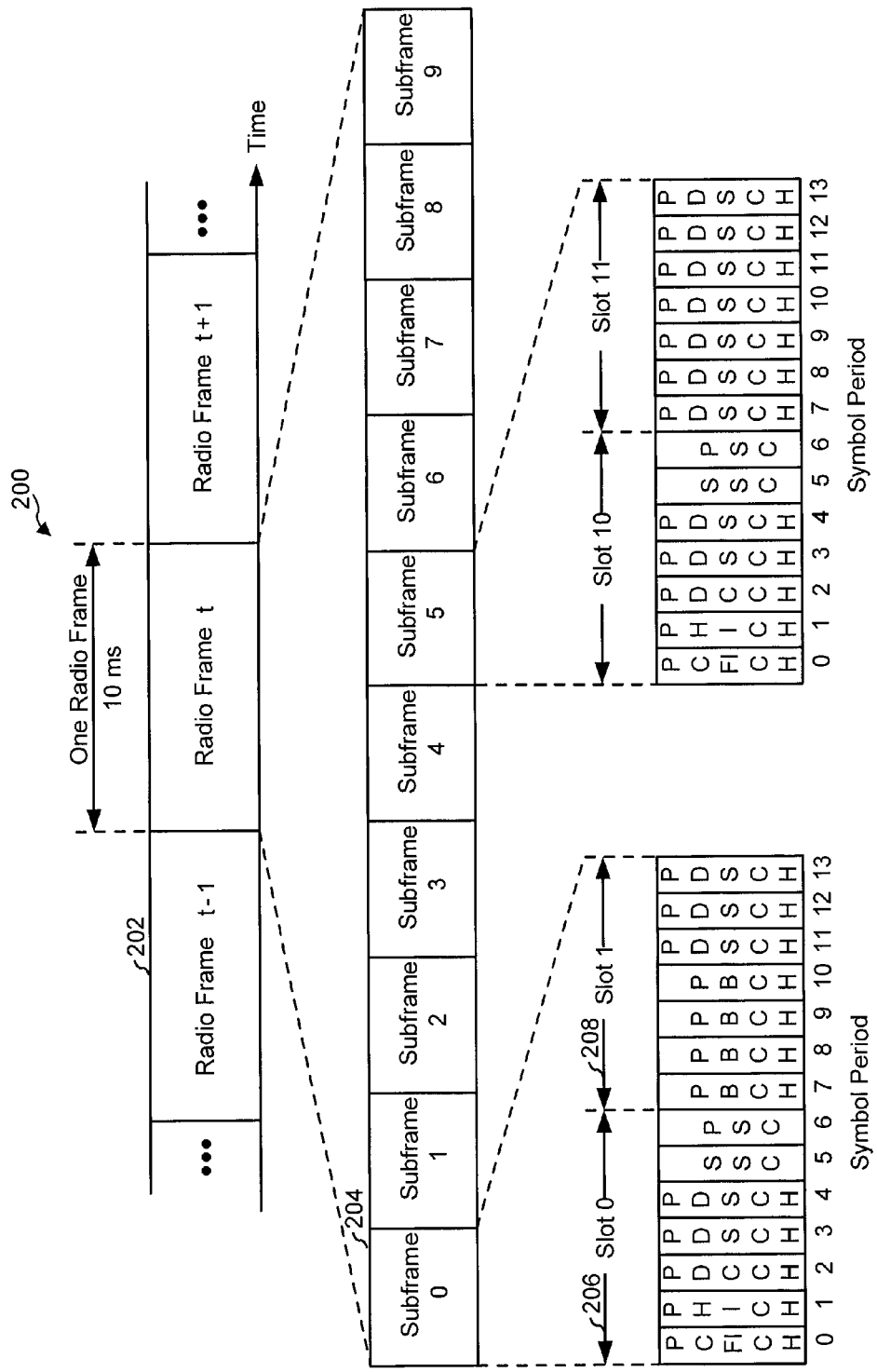
FIG. 2 is a block diagram conceptually illustrating an example of a downlink frame structure in a telecommunications system.

FIG. 2 shows a down link frame structure 200 used in LTE. The transmission timeline for the downlink may be partitioned into units of radio frames, such as radio frame 202. Each radio frame may have a predetermined duration (e.g., 10 milliseconds (ms)) and may be partitioned into 10 subframes with indices of 0 through 9, such as subframe 0 204. Each subframe may include two slots, such as slot 0 206 and slot 1 208. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical hybrid automatic repeat/request (HARQ) Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels can correspond to an LTE configuration.

The eNB may send the PSS, SSS and PBCH in a center of the system bandwidth used by the eNB (e.g., a center 1.08 megahertz (MHz)). The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REG). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc. Moreover, it is to be appreciated that the UE can utilize a similar subframe and slot structure to communicate with the eNB on the uplink. For example, the UE can transmit physical uplink control channel (PUCCH), physical uplink shared channel (PUSCH), sounding reference signal (SRS), or other communications over one or more symbol periods in one or more slots of a subframe.

Figure 3:
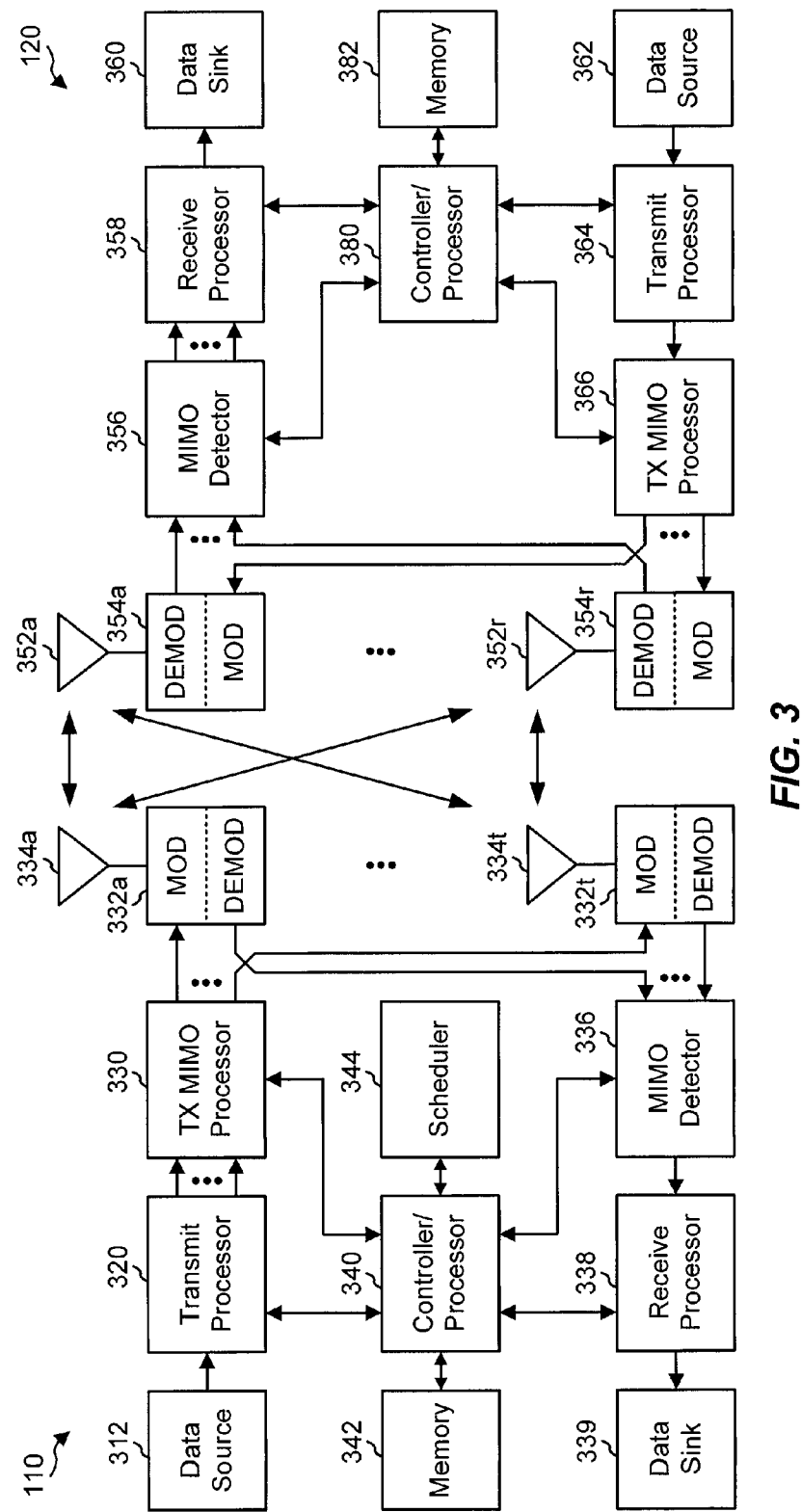
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODS) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIG. 8, and/or other processes for the techniques described herein. The memories 342 and 382 may store data and program codes for the base station 110 and the UE 120, respectively, which can include instructions for executing the methods described in FIGS. 6, 16, and 17, and/or the like. A scheduler 344 may schedule UEs for data transmission on the downlink and/or uplink.

Carrier Aggregation

LTE-Advanced UEs can use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments can conserve spectrum and are a good fit for the typically asymmetric bandwidth utilization by broadband subscribers, though other assignments can be possible.

Carrier Aggregation Types

Figure 4A:
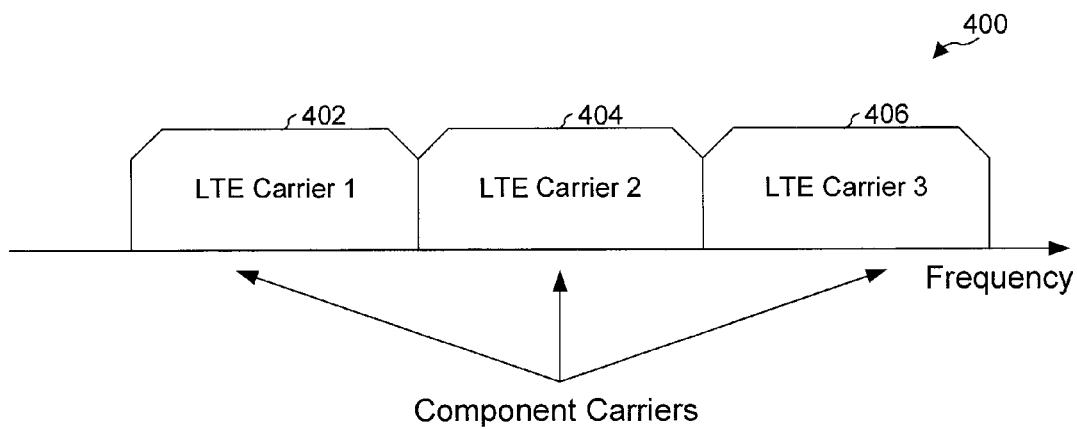
FIG. 4A discloses a continuous carrier aggregation type.
Figure 4B:
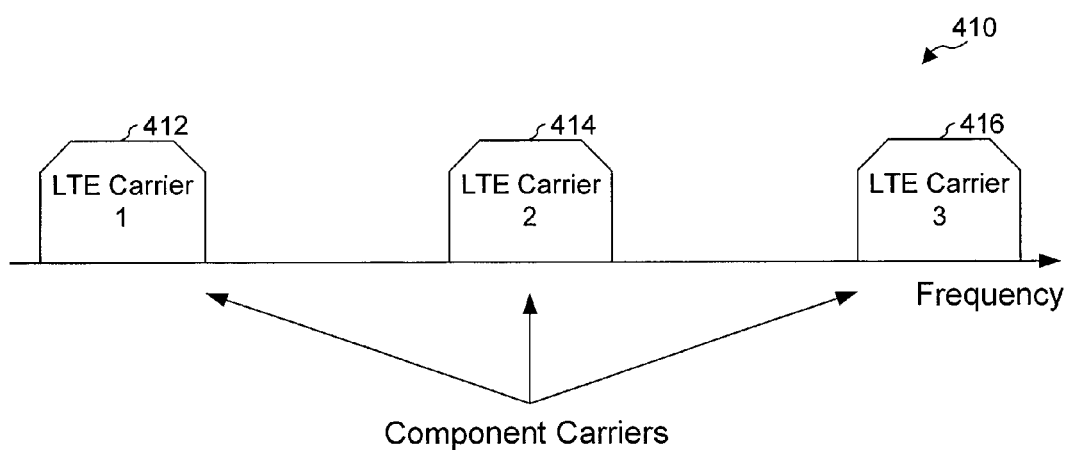
FIG. 4B discloses a non-continuous carrier aggregation type.

For the LTE-Advanced mobile systems, two types of carrier aggregation (CA) methods have been proposed, continuous CA and non-continuous CA, examples of which are illustrated in FIGS. 4A and 4B. Non-continuous CA occurs when multiple available component carriers 410 are separated along the frequency band (FIG. 4B). On the other hand, continuous CA occurs when multiple available component carriers 400 are adjacent to each other (FIG. 4A). As shown, for example, in continuous CA, carrier 1 402, carrier 2 404, and carrier 3 406 are adjacent in frequency. In non-continuous CA, carrier 1 412, carrier 2 414, and carrier 3 416 are not adjacent in frequency. Both non-continuous and continuous CA aggregate multiple LTE/component carriers to serve a single unit of LTE Advanced UE.

Multiple RF receiving units and multiple FFTs may be deployed with non-continuous CA in a LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5:
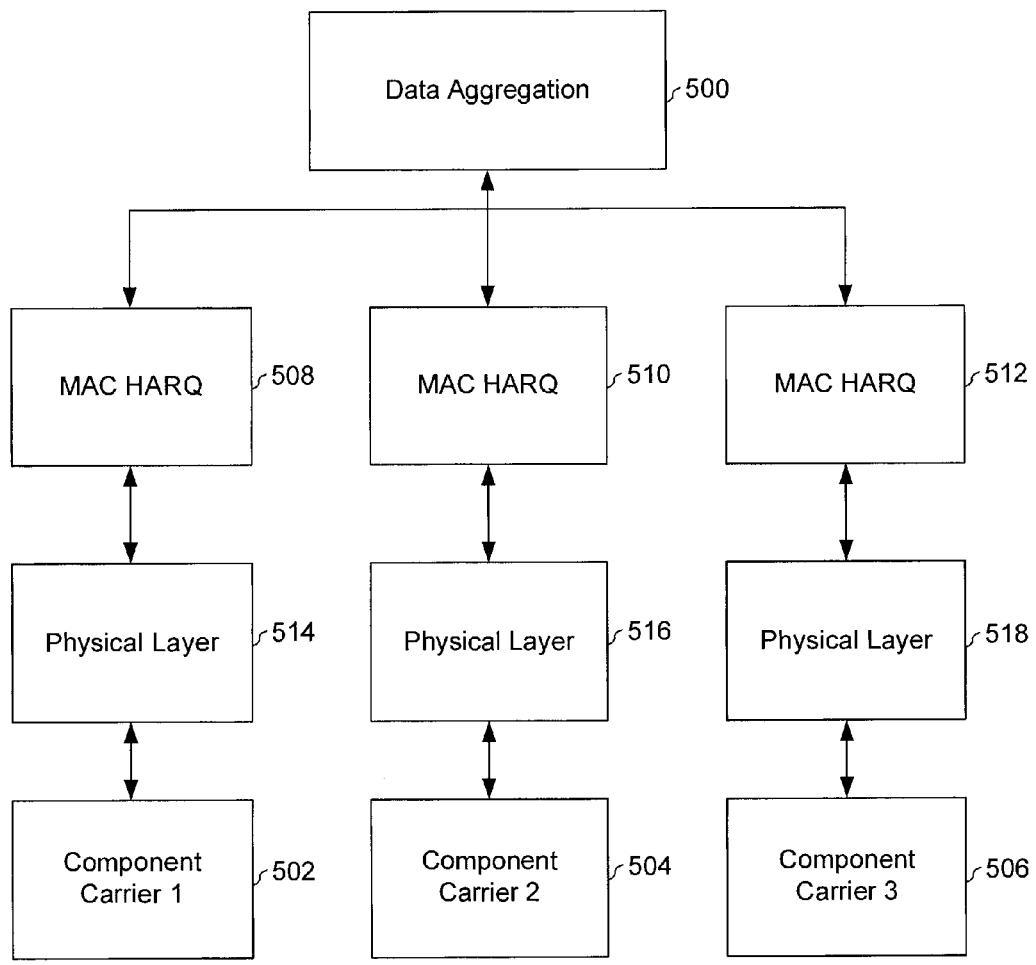
FIG. 5 discloses MAC layer data aggregation.

FIG. 5 illustrates performing data aggregation 500 to aggregate transmission blocks (TBs) from different component carriers 502, 504, and 506 at the medium access control (MAC) layer (FIG. 5) for an International Mobile Telecommunications (IMT)-Advanced or similar system. With MAC layer data aggregation, each component carrier has its own independent hybrid automatic repeat request (HARQ) entity 508, 510, and 512 in the MAC layer and its own transmission configuration parameters (e.g., transmitting power, modulation and coding schemes, and multiple antenna configuration) in the physical layer 514, 516, and 518. Similarly, in the physical layer, one HARQ entity can be provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced (e.g., for the dedicated control channel).

Multiple control channels for different component carriers are jointly coded and then transmitted over the entire frequency band formed by a third CA method. This approach offers low signaling overhead and high decoding performance in control channels, at the expense of high power consumption at the UE side. However, this method may not be compatible with LTE systems.

Handover Control

It is preferable to support transmission continuity during the handover procedure across multiple cells when CA is used for an IMT-Advanced UE. However, reserving sufficient system resources (e.g., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Figure 6:
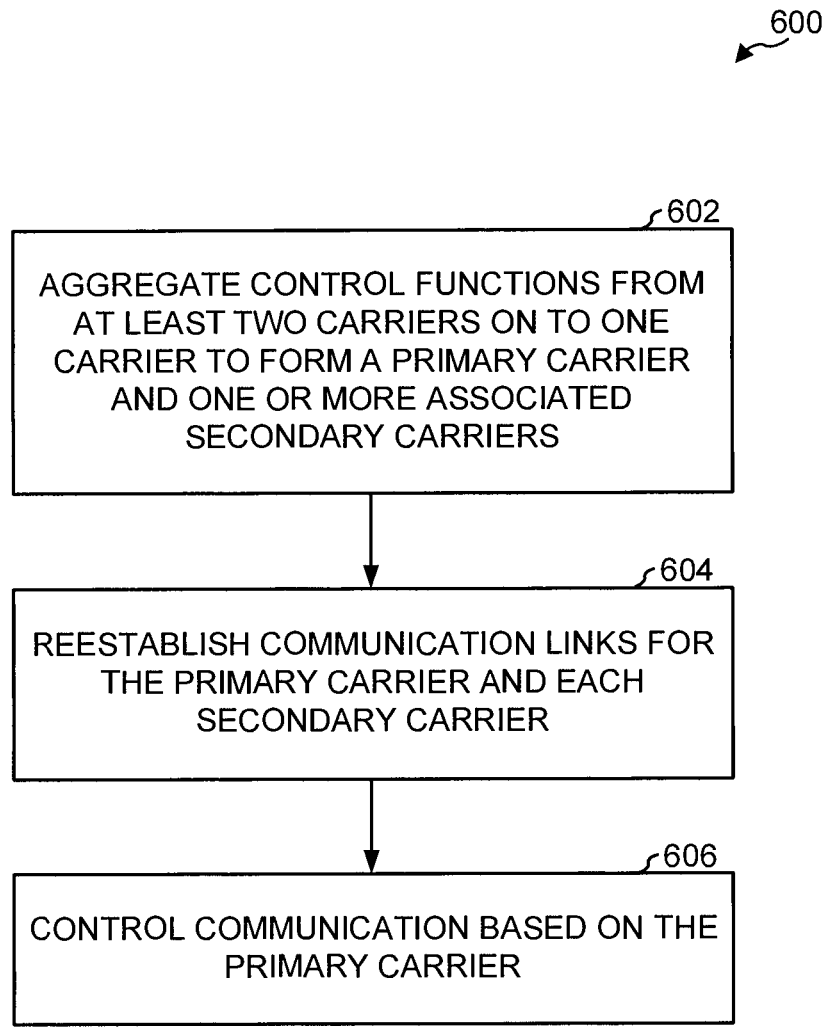
FIG. 6 is a block diagram illustrating a methodology for controlling radio links in multiple carrier configurations.

FIG. 6 illustrates a methodology 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next at block, 604, communication links are established for the primary carrier and each secondary carrier. Then, communication is controlled based on the primary carrier in block 606.

Enhanced PDCCH (ePDCCH)

In LTE Release 11 (Rel-11), a new control channel referred to as enhanced Physical Downlink Control Channel (ePDCCH) is introduced. Unlike legacy PDCCH, which occupies the first several control symbols in a subframe, ePDCCH occupies the data region, similar to Physical Downlink Shared Channel (PDSCH).

Figure 7:
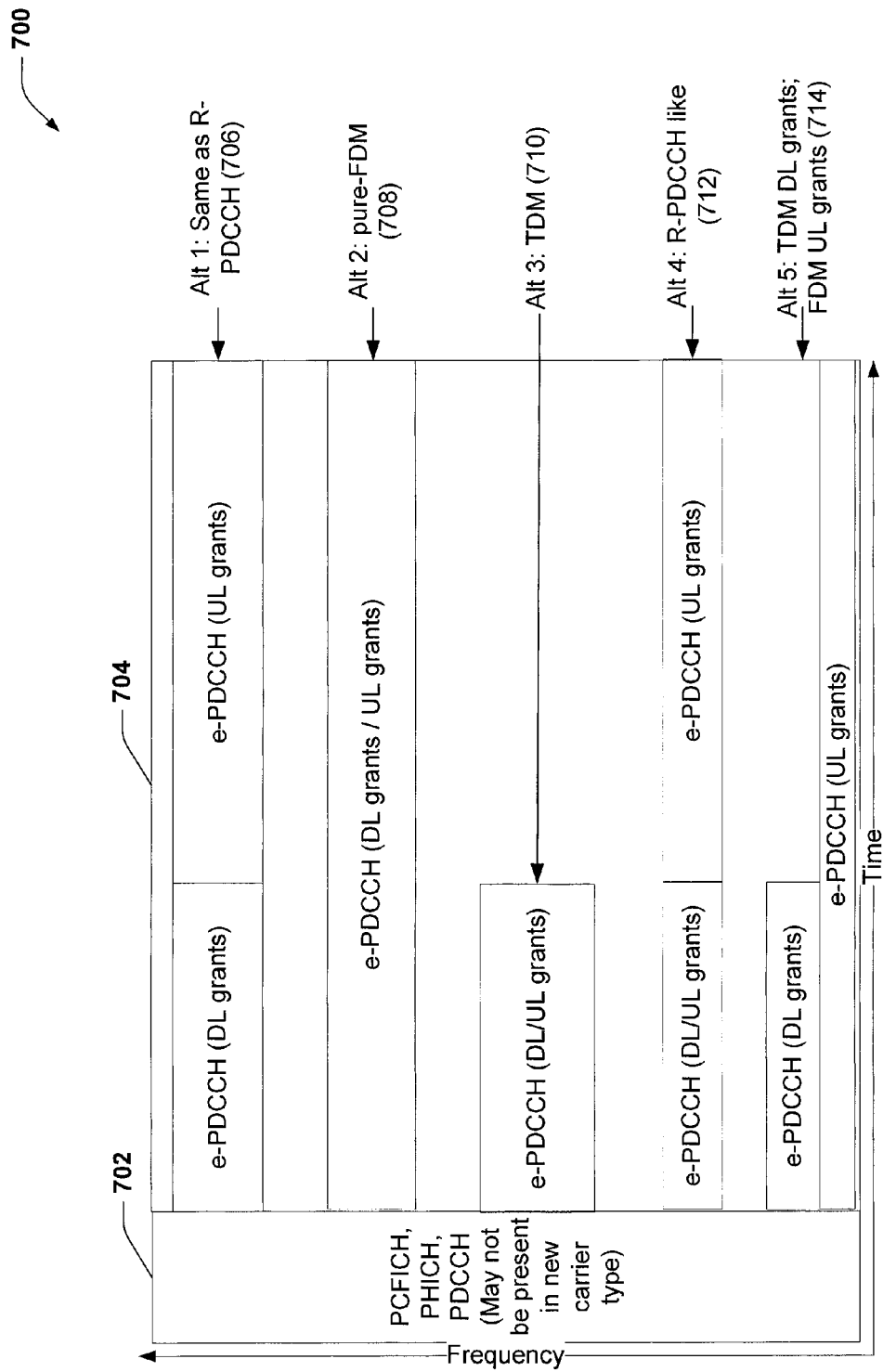
FIG. 7 is a block diagram of example resource allocations for a plurality of enhanced control channel designs.

FIG. 7 illustrates various example ePDCCH structures 700 in an example portion of time over a portion of frequency, which can be a subframe. For example, a portion of initial resources in the subframe can be reserved for a legacy control region 702 for communicating control data to legacy devices, which can include PDCCH, PCFICH, PHICH, and/or similar channels. In LTE, the legacy control region 702 can be a number of OFDM symbols, n, in the subframe where n can be between one and three. It is to be appreciated that where ePDCCH is defined for a new carrier type, the legacy control region 702 may not be present. In any case, the remaining resources can comprise a data region 704 of the subframe. Thus, unlike legacy PDCCH, ePDCCH for a new carrier type may occupy only the data region 704.

Five alternatives are depicted for defining an enhanced control channel structure, though it is to be appreciated that other alternatives are possible. For example, an enhanced control channel structure can support increased control channel capacity, support frequency domain inter-cell interference coordination (ICIC), achieve improved spatial reuse of control channel resources, support beamforming and/or diversity, operate on a new carrier type and in Multicast/Broadcast over Single Frequency Network (MBSFN) subframes, coexist on the same carrier as legacy devices, etc.

In alternative 1 706, the enhanced control channel structure can be similar to relay-PDCCH (R-PDCCH), such that downlink grants are assigned over the control channel in at least a portion of frequency over a first portion of region 704, and uplink grants are assigned over the control channel in the portion of frequency over a second portion of the region 704. In alternative 2 708, the enhanced control channel structure allows downlink and uplink grants to be assigned over a portion of frequency in region 704 spanning both the first and the second portions. In alternative 3 710, the enhanced control channel structure allows downlink and uplink grants to be assigned over a portion of frequency using TDM in at least a portion of region 704. In alternative 4 712, the enhanced control channel structure allows downlink and uplink grants to be assigned over the control channel in at least a portion of frequency over a first portion of region 704, and uplink grants are assigned over the control channel in the portion of frequency over a second portion of the region 704. Note, the first portion of region 704 and the second portion of region 704 may not be configured or operable to overlap. In alternative 5 714, downlink grants can be assigned using TDM over at least a portion of region 704, while uplink grants can be assigned using FDM in a different portion of frequency over region 704.

Using one or more of the alternatives, it is to be appreciated that an enhanced control channel can allow assignment of resources using various multiplexing schemes for downlink and/or uplink assignments as compared to conventional legacy control channel structures.

Additionally, for ePDCCH, one or more additional conditions or agreements may apply. For example, both localized and distributed transmission of the ePDCCH may be supported. In this case, at least for localized transmission, and for distributed transmission where a Common Reference Signal (CRS) is not used for demodulation of the enhanced control channel, the demodulation of the enhanced control channel is based on a DeModulation-Reference Signal (DM-RS) transmitted in one or more Physical Resource Block(s) (PRB(s)) used for transmission of the enhanced control channel.

Further, for example, in some cases ePDCCH messages may span both the first and second slots (e.g., FDM based ePDCCH) with a restriction on a maximum number of Transport CHannel (TrCH) bits receivable in a Transmission Time Interval (TTI), e.g. to allow a relaxation of the processing requirements for the UE. Also, for example, multiplexing of PDSCH and ePDCCH within a PRB pair may not be permitted.

Moreover, for example, in some cases Rank-2 SU-MIMO may not be supported for a single blind decoding attempt. And, the same scrambling sequence generator may be used for ePDCCH DM-RS as for PDSCH DM-RS.

Thus, resource assignment for an enhanced control channel can be defined to accommodate one or more of the enhanced alternative control channel structures.

New Carrier Type

The following concepts can be applied to a new carrier type or an extension carrier, a single carrier, two or more carriers in CA, coordinated multiple point (CoMP), and/or any non-backward compatible carrier, such as a new carrier type that may be introduced in LTE Release 12 (Rel-12), allowing resource granting within resources of various portions of a subframe. In an aspect, the new carrier type or extension carrier may be a carrier that is supported in addition to LTE Release 8 (Rel-8) carriers. In some aspects, the new carrier type or extension carrier may be an extension of another carrier, and as such, may have to be accessed as a part of a carrier aggregation set. In particular, the present apparatus and methods enable awareness of MBMS subframes based on broadcast signaling and/or unicast signaling in a data region of a subframe.

In some cases, such as in an LTE new carrier type that utilizes ePDCCH and provides both MBMS and unicast services, the network may experience problems in indicating MBMS subframes since the typically utilized control region, e.g. legacy control region 702, is not present. Accordingly, the present apparatus and methods provide one or more alternatives to enable a network component, such as a base station, to transmit a new carrier type, including an ePDCCH, that indicates MBSFN subframes, and/or a subset of subframes within the set of MBSFN subframes, thereby signaling the presence of MBMS to allow derivation of the corresponding MBMS subframes by a UE or a group of UEs.

Figure 8:
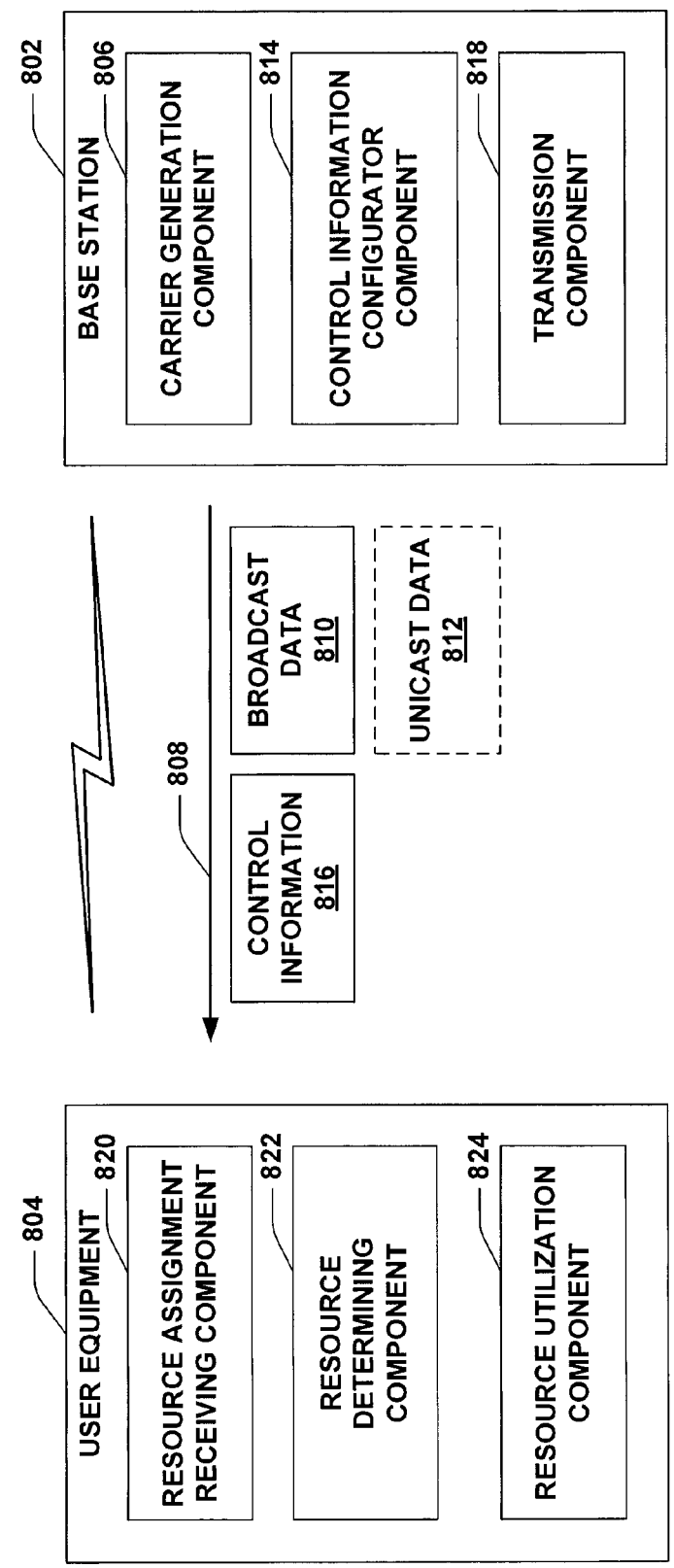
FIG. 8 is a schematic diagram of an aspect of a wireless communication system including a base station configured to generate a new carrier type that supports broadcast and unicast services.

Referring to FIG. 8, in one aspect, a wireless communication system 800 that enables broadcast and unicast services, such as MBMS, in a new carrier type or extension carrier. System 800 includes a base station 802 that can provide wireless network access to a device 804. Device 804 can be a UE, modem (or other tethered device), a portion thereof, and/or the like. Base station 802 can be a macro base station, femto node, pico node, mobile base station, relay, device (e.g., communicating in peer-to-peer or ad-hoc mode with device 804), a portion thereof, and/or the like.

Base station 802 includes a carrier generation component 806 configured to generate a new carrier type or extension carrier 808 capable of carrying data traffic including broadcast data 810 and unicast data 812 respectively corresponding to a broadcast service and a unicast service. For instance, the broadcast service may correspond to an MBMS service provided by base station 802. Moreover, for example, new carrier type 808 may be a type of carrier that is non-backward compatible carrier, such as a new carrier type that may be introduced in LTE Release 12 (Rel-12). In other words, the new carrier type 808 may be a carrier type that is non-backward compatible with existing carriers. For example, the existing carrier may comprise a cell specific reference signal that may not be compatible with other carrier types, such as an LTE new carrier type.

In an aspect, new carrier type 808 may be a carrier that is supported in addition to LTE Release 8 (Rel-8) carriers. In some aspects, new carrier type 808 may be an extension of another carrier, and as such, may have to be accessed as a part of a carrier aggregation set.

Additionally, base station 802 includes a control information configurator 814 operable to generate control information 816 for new carrier type 808. For example, control information 816 includes any information that identifies a presence of at least broadcast data 810, and optionally unicast data 812, in new carrier type 808. For instance, control information configurator 814 determines control information 816 based on a resource allocation for broadcast service, e.g., in MBMS based on designated ones of a plurality of MBSFN subframes of new carrier type 808 within a periodic transmission interval, where the plurality of MBSFN subframes are capable of carrying broadcast data 810 and/or unicast data 812. As such, in the case where the broadcast service corresponds to an MBMS service, the allocated resources for broadcast data 810 may be referred to as MBMS resources, while the remaining resources may be referred to as non-MBMS resources and may carry control information 816 and/or unicast data 812.

In one aspect, in a new carrier type, the information of MBMS subframes can be based on broadcast signaling and/or unicast signaling. Further, the derivation of MBMS subframes can be based on the indication of MBSFN subframes, and/or based on one or more indications of the subset of subframes within the set of MBSFN subframes indicating the presence of MBMS for a UE or a group of UEs. Alternatively, the set of MBMS subframes are explicitly indicated.

In particular, in an aspect, such as when the enhanced control channel includes an LTE Rel-11 enhanced Physical Downlink Control Channel (ePDCCH), which may or may not include legacy control resources, e.g. the first one or two symbols in a subframe, control information configurator 814 may position control information 816 and/or unicast data 812 to be carried by non-MBMS resources allocated to a data region of a subframe typically reserved for broadcast data traffic. For example, in one case, control information configurator 814 may allocate MBMS resources and non-MBMS resources to separate ones of the plurality of MBSFN subframes in a time-division multiplexing fashion (TDM), and thus position control information 816 in non-MBMS resources in a set of subframes separate from another set of subframes containing MBMS resources. In another case, for instance, control information configurator 814 may allocate MBMS resources and non-MBMS resources to a same one of the plurality of MBSFN subframes, distributing the respective resources in each respective subframe either in a time-division multiplexing fashion (TDM), or in a frequency-division multiplexing fashion, or a combination of both across the plurality of MBSFN subframes. In any case, control information configurator 814 enables new carrier type 808 to support both broadcast services and unicast services.

Additionally, base station 802 includes a transmission component 818 for transmitting new carrier type 808 including control information 816 as well as at least broadcast data 810 and optionally unicast data 812. For example, transmission component 818 may broadcast new carrier type 808 across a coverage area of base station 802.

Device 804 includes resource assignment receiving component 820 for receiving a resource from a base station for receiving communications therefrom and/or transmitting communications thereto. For example, the received resources include, for example, new carrier type 808 including control information 816 and broadcast data 810 and/or unicast data 812 transmitted from base station 802. Further, device 804 includes a resource determining component 822 for determining one or more resources over which to receive or transmit data corresponding to the resource assignment. For example, resource determining component 822 can detect and interpret control information 816 to enable acquisition of broadcast data 810 and/or unicast data 812 from one or more corresponding transmitted subframes. Further, resource determining component 822 can detect and interpret control information 816 to enable UL scheduling, e.g. in a cross-subframe, multi-subframe, and/or cross-carrier manner. Additionally, device 804 includes a resource utilization component 824 for consuming indicated resources designated for device 804. For instance, in an aspect, resource utilization component 824 may include, but is not limited to, a processor, output mechanism, media player or other application for presenting the received broadcast data 810 to a user of device 804. In another aspect, resource utilization component 824 may include a transmitter or transceiver for sending communications, e.g. based on the UL scheduling received in the control information 816.

Figure 9:
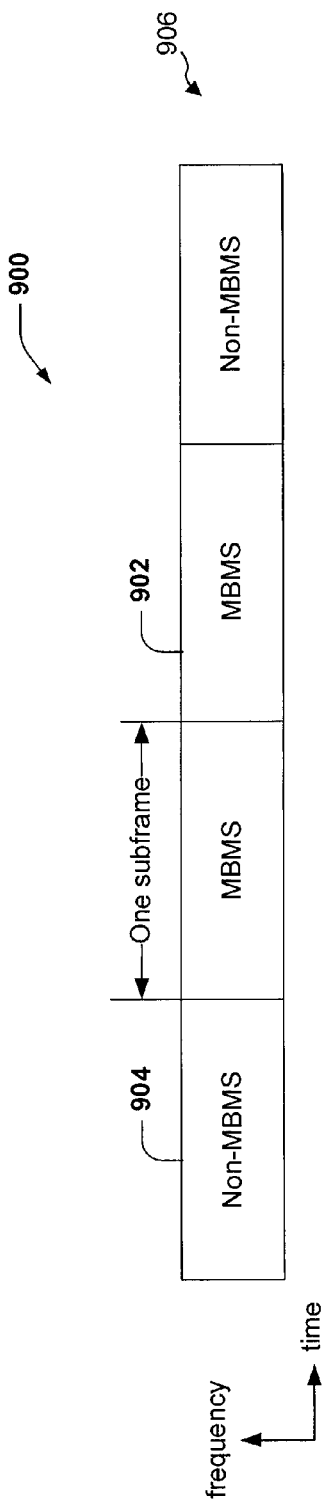
FIG. 9 is a block diagram of an aspect of a TDM-based separation of MBMS and non-MBMS resources between different MBSFN subframes.
Figure 10:
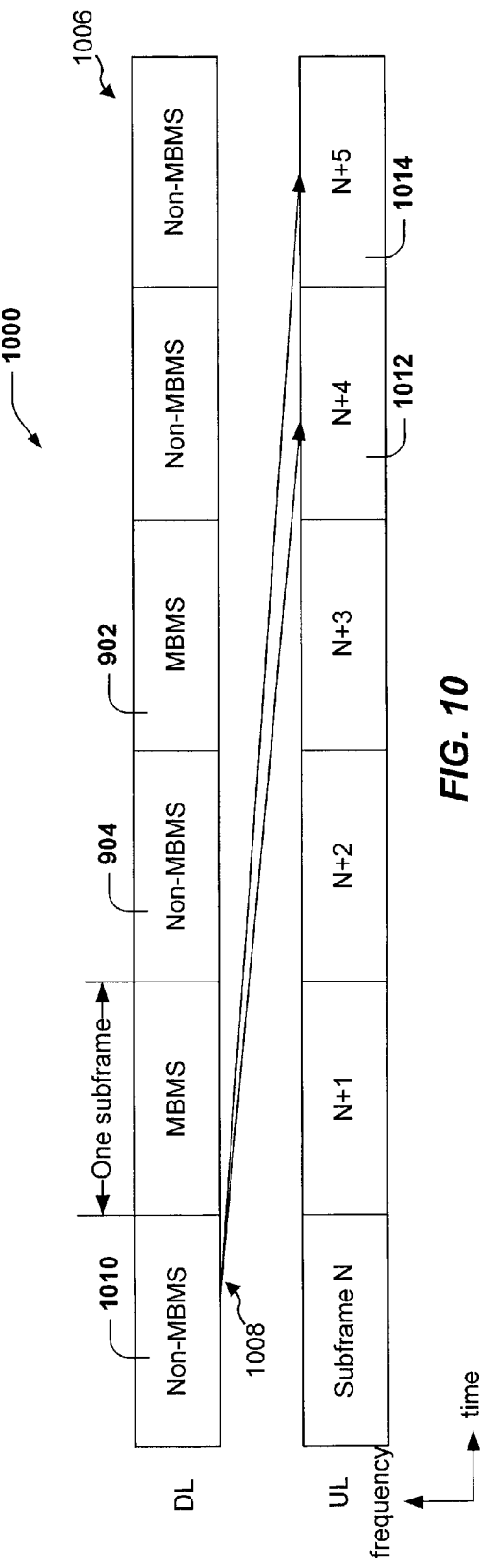
FIG. 10 is a block diagram of another aspect of a TDM-based separation of MBMS and non-MBMS resources between different MBSFN subframes, including support for uplink (UL) scheduling.

Referring to FIGS. 9-15, examples of different resource allocations are presented based on different operating modes of the present apparatus and methods. In particular, resource allocations 900 and 1000 respectively of FIGS. 9 and 10 represent examples of a pure time-division multiplexing (TDM) aspect where MBMS resources 902 and non-MBMS resources 904 are separated into different ones of a plurality of subframes, e.g. Multicast/Broadcast over a Single Frequency Network (MBSFN) subframes. In contrast, resource allocations 1100, 1200, 1300, 1400 and 1500 of FIGS. 11-15 respectively represent different modes (e.g. TDM-based or frequency-division multiplexing (TDM)-based) of enabling MBMS resources 902 and non-MBMS resources 904 to co-exist within a single one of a plurality of subframes, e.g. MBSFN subframes. It should be noted that although not separately represented, the present apparatus and methods also contemplate a resource allocation wherein MBMS resources 902 and non-MBMS resources 904 co-exist within a single subframe in a mixed TDM-based and FDM-based fashion, e.g. where one subframe may include a TDM-based allocation and another subframe in the plurality of subframes may include an FDM-based allocation.

Referring to FIG. 9, in one aspect, the present apparatus and methods are configured to produce a time domain based resource allocation 900 that separates MBMS resources 902 and non-MBMS resources 904 into different ones of a plurality of Multicast/Broadcast over a Single Frequency Network (MBSFN) subframes 906 within a radio frame. For example, the radio frame is one of a set of radio frames for transmission in a repeating interval, and each of the plurality of MBSFN subframes 906 includes at least one but not both of MBMS resource 902 or non-MBMS resource 904. In other words, in this case, control information 816 (FIG. 8) for indicating the presence of MBMS services within the radio frame is positioned in non-MBMS resource 904. For example, the present apparatus and methods may be configured, but are not limited to being configured, to generate and transmit a Multicast Control CHannel (MCCH) change notification message via PDCCH using Downlink Control Information (DCI) format 1C scrambled by Multicast-Radio Network Temporary Identifier (M-RNTI) in one or more non-MBMS resources 904, which is this case correspond to non-MBMS subframes since the resources are separated over time on a subframe basis.

Referring to FIG. 10, in another TDM-based aspect, the present apparatus and methods are configured to produce a time domain based resource allocation 1000 that separates MBMS resources 902 and non-MBMS resources 904 into different ones of a plurality of MBSFN subframes 1006, similar to FIG. 9. In this case, however, resource allocation 1000 additionally includes UL scheduling information 1008 within at least one non-MBMS resource 904, which in this case defines a non-MBMS subframe, e.g. subframe 1010, to enable a given DL subframe to schedule one or more UL subframes, e.g. subframes 1012 and 1014.

Referring to FIGS. 11-15, in contrast to FIGS. 9 and 10, example resource allocations 1100, 1200, 1300, 1400 and 1500 of the present apparatus and methods allow multiplexing of MBMS resources 902 and non-MBMS resources 904 within a single subframe 1102, e.g. one of a plurality of MBSFN subframes in a radio frame of a set that repeats at a transmission interval. In some aspects, for example, such multiplexing within single subframe 1102 may include, but is not limited to, providing non-MBMS control signals/channels such as one or more of:

enhanced Physical Control Format Indicator Channel (ePCFICH) or PCIFCH: to indicate the control region;

enhanced Physical HARQ Indicator Channel (ePHICH) or PHICH: for non-adaptive UL re-transmissions;

ePDCCH or PDCCH: for adaptive UL (re)-transmissions, and which may also include DL grants, if DL data is allowed to be multiplexed with PMCH, and/or DCI formats 3/3A for group power control.

In FIGS. 11-13, in one aspect, the present apparatus and methods are configured to produce a frequency domain based resource allocation 1100, 1200, and 1300 that multiplexes MBMS resources 902 and non-MBMS resources 904 into localized or distributed regions within one or more single subframes 1102, such as an MBSFN subframe, within a radio frame. In FIG. 11, for example, resource allocation 1100 locates non-MBMS resources 904 on two edges of a bandwidth of subframe 1102, where the edges may be symmetric or asymmetric. In FIG. 12, for example, resource allocation 1200 locates non-MBMS resources 904 in a distributed fashion over the entire bandwidth of subframe 1102. In FIG. 13, for example, resource allocation 1300 locates non-MBMS resources 904 at one edge of the bandwidth of subframe 1102. In each aspect of FIGS. 11-13, MBMS resource 902 may include the PMCH, which can span a fraction or the entire bandwidth. Further, in each aspect, the location of PMCH can be an explicitly or implicitly signaled (e.g., semi-static via Radio Resource Control (RRC) or e.g., dynamic via ePCFICH specifying PMCH bandwidth and/or location) indication, or fixed. Both the semi-static and dynamic signaling options can be coordinated across a SFN area via backhaul signaling. Also, it should be noted that the location can be the same for some subframes, or can further be subframe dependent.

Additionally, in other aspects of resource allocations 1100, 1200, and 1300, the Cyclic Prefix (CP) length and tone spacing of PMCH and non-MBMS resources 904 can be the same or different. In one example, which should not be construed as limiting, the CP length for PMCH can be an extended CP with 15 kHz tone spacing (with a 16.67 us CP duration) or 7.5 kHz tone spacing (with a 33.33 us CP duration). It should be noted that, in some aspects, different values of CP and tone spacing may be preferred, as when the CP and tone spacing for non-MBMS resources 904 is the same as PMCH (e.g. MBMS resources 902) some inefficiency may occur, e.g. since the normal CP can generally be more efficient than the extended CP. Additionally, in an aspect, when 7.5 kHz is used for non-MBMS resources 904, then new DM-RS patterns should be defined for 7.5 kHz tone spacing (currently DM-RS is defined for 15 kHz tone spacing only).

In other words, when different CPs and/or tone spacings are utilized for PMCH and non-MBMS resources 904, then a UE monitoring both PMCH and non-MBMS resources 904 needs to handle two CPs/tone spacings, which leads to more complexity.

In addition, in an optional aspect, a few reserved Resource Block (RBs) may be used as a guard band between subbands with different CP-types to control self-interference, since different symbol lengths are not mutually orthogonal.

The determination at a user equipment of a CP type and/or a tone spacing for non-MBMS resources in subframes carrying MBMS can be performed in an explicit or an implicit manner. In the former case, a CP type and/or tone spacing for a set of subframes may be indicated via a higher layer signaling. The CP type and/or tone spacing can be different from the CP type and/or tone spacing assumed in other subframes (e.g., a reference CP type and/or tone spacing in a non-MBMS subframe). As an example, a normal CP may be used in a non-MBMS subframe and an extended CP may be used in an MBMS subframe for non-MBMS services. The indication can be for non-MBMS resources such as ePDCCH, ePHICH, and/or ePCFICH. The indicated set of subframes may or may not be fully aligned with the set of MBMS subframes. In other words, subframe-dependent CP type and/or tone spacing may be generally indicated to allow more flexible operation. In some instances, a UE may determine the CP type and/or tone spacing for non-MBMS resources in subframes carrying MBMS in an implicit manner. As an example, the UE may assume that in a subframe carrying MBMS, the CP type and/or tone spacing is always the same as those for MBMS. As another example, the UE may assume that in a subframe carrying MBMS, the CP type and/or tone spacing is always the same as those in a non-MBMS subframe.

In another aspect, when no legacy control (e.g., PDCCH, PHICH, PCFICH) exists, then ePDCCH, ePHICH, and/or ePCFICH may be present in non-MBMS resources 904.

Moreover, in further aspects, the multiplexing MBMS resources 902 and non-MBMS resources 904 of FIGS. 11-13 can use orthogonal or non-orthogonal resources. For instance, in the latter case, non-MBMS resources 904 may puncture MBMS resources 902. Puncturing indicates that if both non-MBMS and MBMS are mapped to a same resource, the resource will only carry transmission for one of them (e.g., only carrying non-MBMS transmission if non-MBMS resources puncture MBMS resources). However, in some instances, the puncturing may have certain limitations, e.g., only a certain number of Resource Elements (REs), only for some ePHICH channels, etc., to minimize the impact. Similarly, in another alternative, MBMS resources 902 may puncture non-MBMS resources 904. In other words, in either case, MBMS resources 902 and non-MBMS resources 904 may include some overlap.

Some or all non-MBMS resources in a MBMS subframe may be reused by MBMS when the reserved non-MBMS resources are not utilized by non-MBMS transmissions. In other words, the bandwidth for MBMS may be subframe dependent. As an example, in a 10 MHz system, 10 RBs may be reserved for non-MBMS services and 40 RBs may be reserved for MBMS services. A UE may determine only the 40 RBs are available for MBMS services in a first MBMS subframe, but may determine that the entire 50 RBs are available for MBMS services in a second MBMS subframe. It may further determine that 45 RBs are available for MBMS services in a third MBMS subframe. The determination can be in an explicit or an implicit manner. In the former case, a UE may receive signaling indicating a total bandwidth for MBMS or an additional bandwidth (in addition to the originally reserved bandwidth for MBMS) for MBMS. As an example, the signaling can be via ePCFICH, which dynamically indicates a set of resources for non-MBMS transmissions (hence, the remaining resources are for MBMS). In the latter case, a UE may determine a bandwidth for MBMS, e.g., via subframe index, blind detection, etc. As an example, a UE may be indicated two possible MBMS bandwidths. A first bandwidth for MBMS may be associated with a first subframe, and a second bandwidth for MBMS may be associated with a second subframe. Alternatively, a UE may blindly detect whether a first bandwidth or a second bandwidth is used in a subframe.

Figure 14:
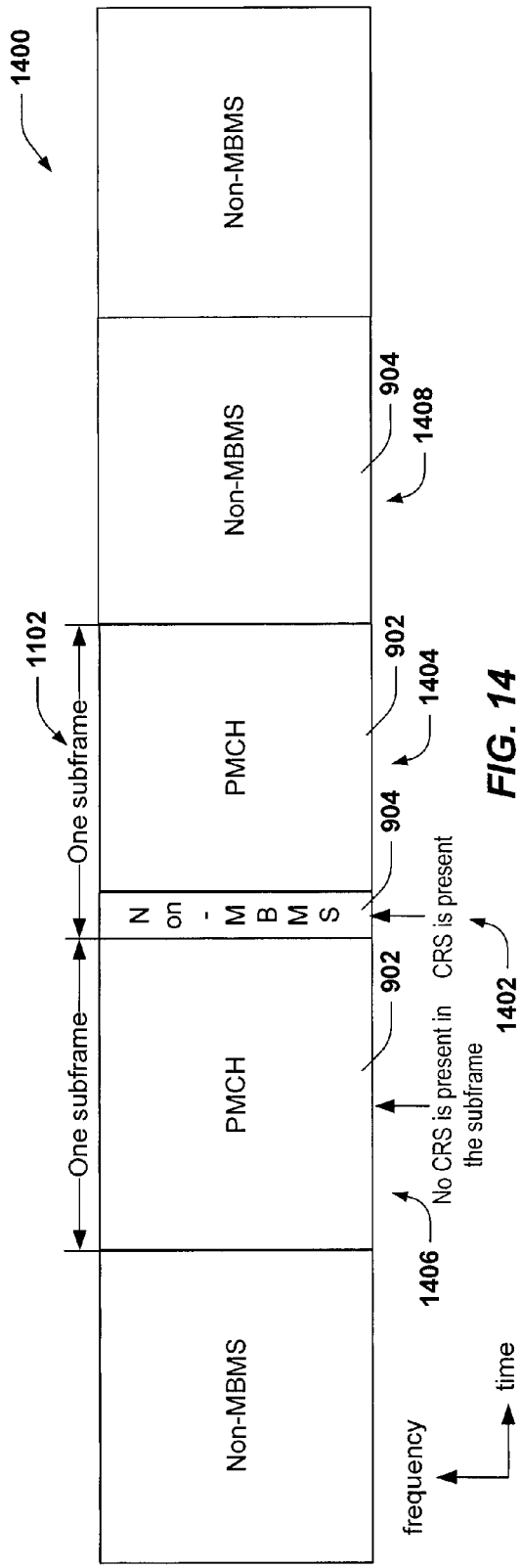
FIG. 14 is a block diagram of an aspect of a TDM-based mixing of MBMS and non-MBMS resources within an MBSFN subframe based on CRS.

Referring to FIG. 14, in one aspect, the present apparatus and methods are configured to produce a time domain based resource allocation 1400 that multiplexes MBMS resources 902 and non-MBMS resources 904 within one or more single subframes, such as an MBSFN subframes, within a radio frame based on CRS 1402. For example, in one aspect, the non-MBMS resource 904 can be present in the first symbol(s) of subframe 1404, at least when CRS 1402 is present, and MBMS resources 902 can occupy the remainder of subframe 1404. Note, MBMS is a service, while PMCH is the actual physical channel carrying the service. When CRS is not present, then non-MBMS resources 904 may be omitted in a respective subframe, e.g. subframe 1406, such that PMCH or MBMS resource 902 occupies the entire subframe. Alternatively, when CRS is not present, the respective subframe, e.g. subframe 1408, may include only non-MBMS resource 904.

Although not illustrated, it should be noted that resource allocation 1400 may include cross-subframe, multi-subframe, and/or cross-carrier scheduling to mitigate the impact on UL scheduling. Further, in this aspect, it should be noted that only legacy control may be present (no new control) in the subframes 1404 since the non-MBMS resource 904 is already present. Moreover, in these aspects, whether CRS is present (in some or all MBMS subframes) can be pre-determined or indicated via some signaling (dynamic or semi-static). As an example, a UE may be indicated via higher layers whether CRS is present in a subframe or not. Alternatively, a UE may be indicated via a control channel whether CRS is present or not.

Additionally, it should be noted that in some aspects of resource allocation 1400 the CP length and/or tone spacing for non-MBMS resources 904 can be different from that for PMCH or non-MBMS resources 902. For instance, in one non-limiting example, one subframe may contain 2 OFDM symbols of 15 kHz and normal CP for non-MBMS resource 904, and 5 symbols of 7.5 kHz and extended CP for PMCH or MBMS resource 902.

Figure 15:
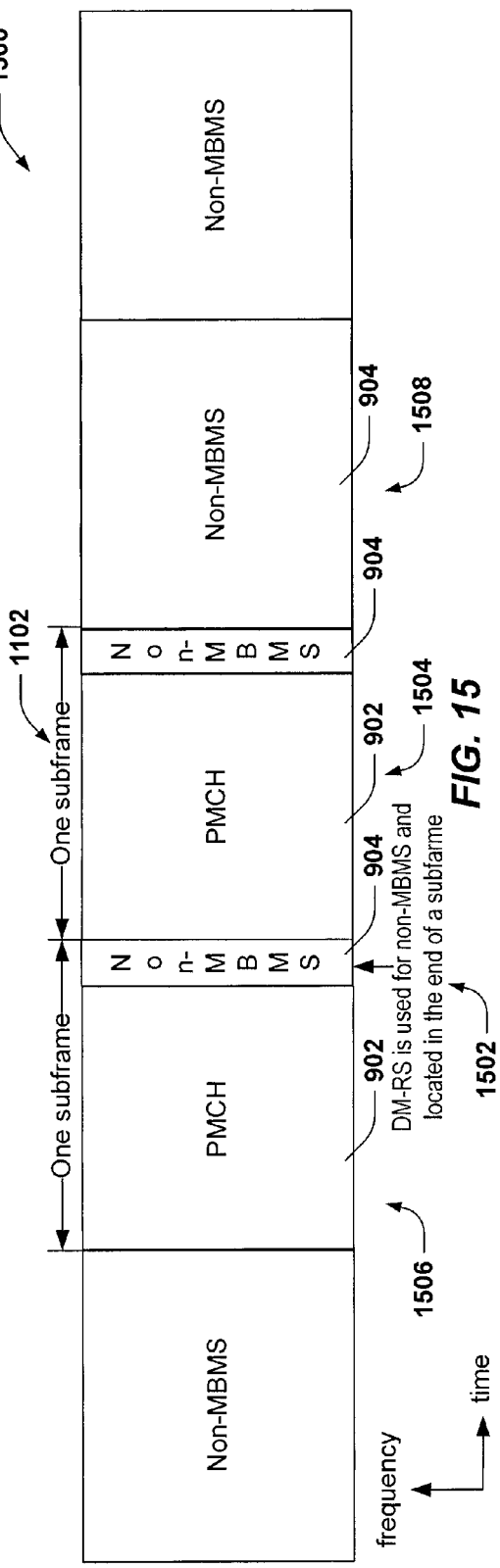
FIG. 15 is a block diagram of an aspect of a TDM-based mixing of MBMS and non-MBMS resources within an MBSFN subframe based on DM-RS.

Referring to FIG. 15, in another aspect similar to FIG. 14, the present apparatus and methods are configured to produce a time domain based resource allocation 1500 that multiplexes MBMS resources 902 and non-MBMS resources 904 within one or more single subframes, such as MBSFN subframes, within a radio frame, where the non-MBMS resource utilizes an enhanced control channel, such as ePDDCH, based on DM-RMS 1502. For example, in one aspect, the non-MBMS resource 904 can be present in the first or last symbol(s) of a subframe, such as subframes 1504 and 1506 respectively, at least when DM-RS 1402 is present. Note, FIG. 15 only illustrates that the non-MBMS resource 904 may be present in the last symbol of the subframe, such as at the end of subframes 1504 and 1506 respectively, but may be present in the first symbol of the subframe, as discussed above. When DM-RS is not present, then MBMS resources 902 may be omitted in a respective subframe, e.g. subframe 1508, such that non-MBMS resource 904 occupies the entire subframe.

In other words, with regard to resource allocation 1500, either all subframes containing PMCH or MBMS resource 902 can have a portion that include non-MBMS resource 904, or only a subset of subframes containing PMCH can have a non-MBMS portion. In the latter case, the present apparatus and methods can provide an indication to a UE regarding this structure. Moreover, as in some of the other examples, the CP length and/or tone spacing for non-MBMS resources 904 can be different from that for PMCH or MBMS resources 902. For example, in one non-limiting case, one subframe can contain 2 OFDM symbols of 15 kHz and a normal CP for non-MBMS resources 904, and 5 symbols of 7.5 kHz and extended CP for PMCH or MBMS resources 902.

Additionally, as mentioned above, a mixture of the TDM-based and FDM-based multiplexing of MBMS resources 902 and non-MBMS resources 904, such as illustrated in FIGS. 11-15, may be utilized within a subframe or across a plurality of subframes. For instance, in one non-limiting example, for MBMS resource-containing subframes with CRS present, a TDM approach (e.g., legacy control) may be utilized, while for MBMS resource containing subframes without CRS, an FDM approach (e.g., new control) may be utilized.

Figure 16:
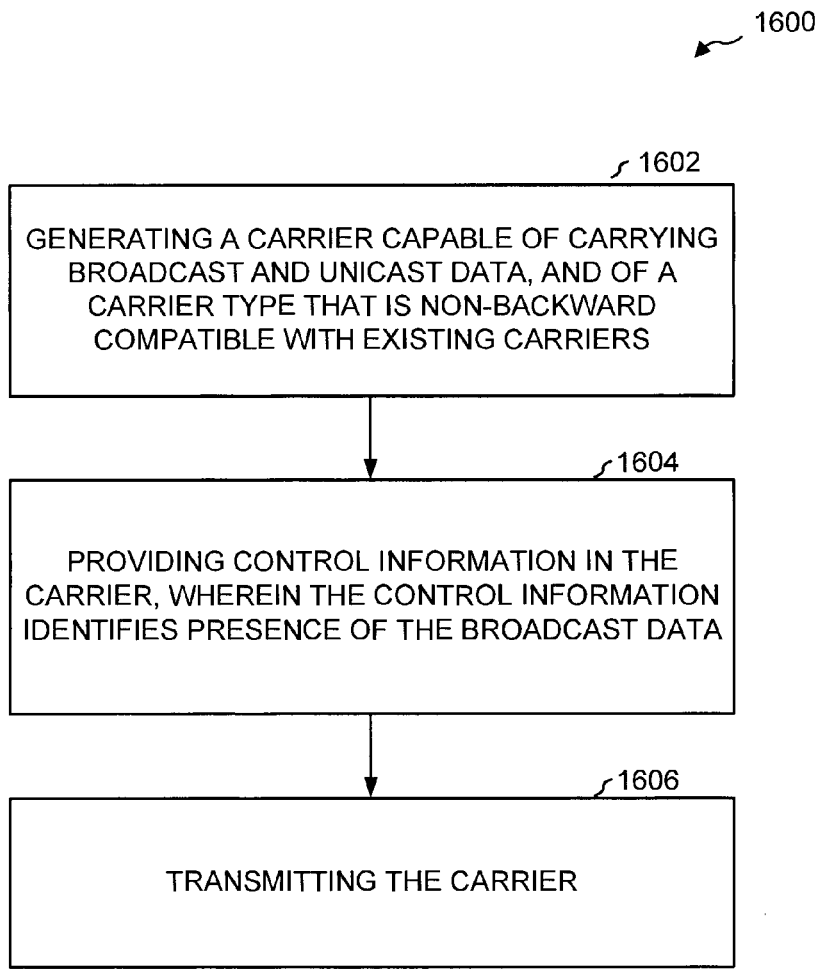
FIG. 16 is a flowchart of an aspect of a method of wireless communication.
Figure 17:
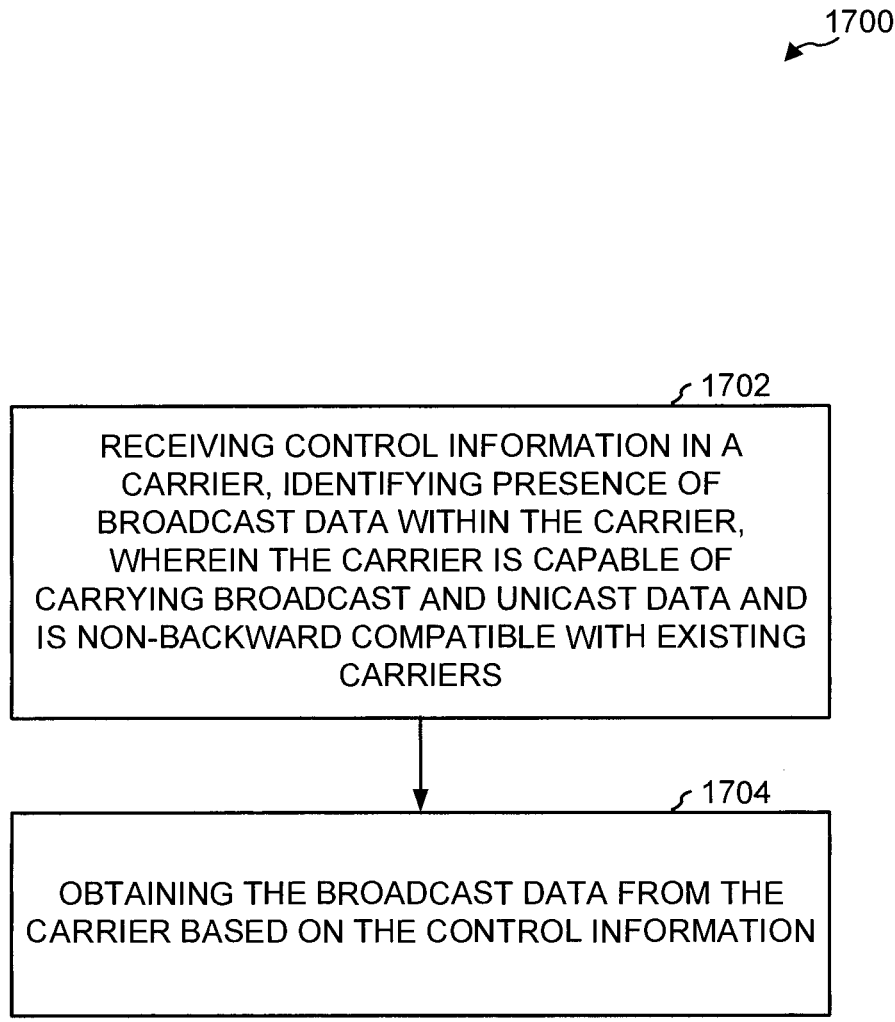
FIG. 17 is a flowchart of an aspect of a method of wireless communication.

Referring to FIGS. 16 and 17, different example methodologies relating to supporting multimedia and unicast service in a new carrier type in LTE are presented. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In FIG. 16, a method 1600 of method of supporting multimedia broadcast services in a wireless communication system includes, at block 1602, generating a carrier capable of carrying data traffic including broadcast data and unicast data, wherein the carrier comprises a carrier type that is non-backward compatible with existing carriers.

In one aspect where a pure TDM-based separation of resources is desired, generating the carrier further comprises including a plurality of Multicast/Broadcast over a Single Frequency Network (MBSFN) subframes within each radio frame of a set of radio frames for transmission in a repeating interval, each MBSFN subframe comprising at least one but not both of a Multimedia Broadcast Multicast Service (MBMS) resource or a non-MBMS resource within a time domain of the MBSFN subframe.

In another aspect, where FDM multiplexing of resources within a subframe is desired, generating the carrier further comprises including a plurality of Multicast/Broadcast over a Single Frequency Network (MBSFN) subframes within each radio frame of a set of radio frames for transmission in a repeating interval, each MBSFN subframe comprising both a Multimedia Broadcast Multicast Service (MBMS) resource and a non-MBMS resource across a frequency domain of the MBSFN subframe.

In an additional aspect, where TDM multiplexing of resources within a subframe is desired, generating the carrier further comprises including a plurality of Multicast/Broadcast over a Single Frequency Network (MBSFN) subframes within each radio frame of a set of radio frames for transmission in a repeating interval, at least one MBSFN subframe comprising both a Multimedia Broadcast Multicast Service (MBMS) resource and a non-MBMS resource across a time domain of the at least one MBSFN subframe.

In still another aspect, where FDM and TDM multiplexing within a subframe may be mixed across a plurality of subframes, generating the carrier further comprises including a plurality of Multicast/Broadcast over a Single Frequency Network (MBSFN) subframes within each radio frame of a set of radio frames for transmission in a repeating interval, the plurality of MBSFN subframes including different MBSFN subframes having both a Multimedia Broadcast Multicast Service (MBMS) resource and a non-MBMS resource within a time domain or a frequency domain of the at least one MBSFN subframe.

Further, at block 1604, method 1600 includes providing control information of the carrier, wherein the control information identifies presence of the broadcast data. For example, in an aspect, the providing of the control information further comprises positioning the control information in the non-MBMS resource.

Additionally, at block 1606, method 1600 includes transmitting the carrier. For example, base station 802 (FIG. 8) is configured to transmit new carrier type 808 (also referred to as extension carrier), such as via a broadcast transmission.

Referring to FIG. 17, a method 1700 of obtaining multimedia broadcast services in a wireless communication system includes, at block 1702, receiving control information of a carrier, wherein the control information identifies presence of broadcast data within the carrier, wherein the carrier is capable of carrying data traffic including the broadcast data and unicast data and comprises a carrier type that is non-backward compatible with existing carriers.

Additionally, at block 1704, method 1700 includes obtaining the broadcast data from the carrier based on the control information.

Figure 18:
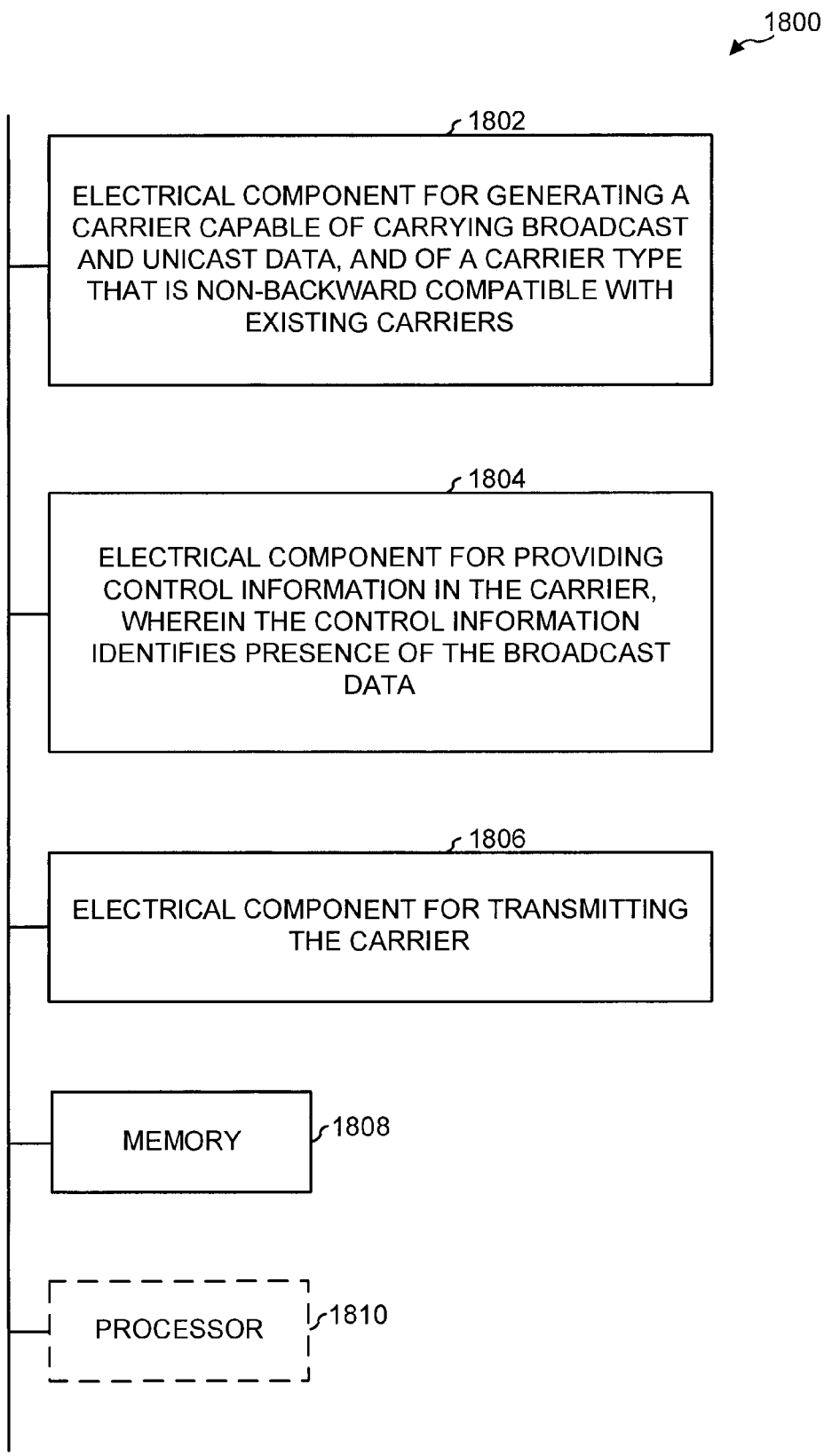
FIG. 18 is a block diagram representation of a portion of a wireless communication apparatus that, for example, may embody or be utilized with the base station of FIG. 1.

Referring to FIG. 18, a portion of a wireless communication apparatus 1800 comprising electrical component 1802 for generating a carrier capable of carrying data traffic including broadcast data and unicast data, wherein the carrier comprises a carrier type that is non-backward compatible with existing carriers. Further, apparatus 1800 may include electrical component 1804 for providing control information of the carrier, wherein the control information identifies presence of the broadcast data. Additionally, the apparatus 1800 may also include electrical component 1806 for transmitting the carrier.

The apparatus 1800 also includes memory 1808 within which the electrical components 1802, 1804, and 1806 can be implemented. Additionally or alternatively, memory 1808 can include instructions for executing electrical components 1802, 1804, and 1806, parameters related to electrical components 1802, 1804, and 1806, and/or the like.

Alternatively, or in addition, apparatus 1800 can include a processor 1810, which may include one or more processor modules, and which retains instructions for executing functions associated with electrical components 1802, 1804, and 1806, or that executes instructions defined by electrical components 1802, 1804, and 1806. While shown as being external to processor 1810, it is to be understood that one or more of electrical components 1802, 1804, and 1806 can exist within processor 1810.

Thus, the apparatus 1800 may further implement various techniques described herein. In one example, the apparatus 1800 can include base station 802 (FIG. 8) to perform the techniques described herein.

Figure 19:
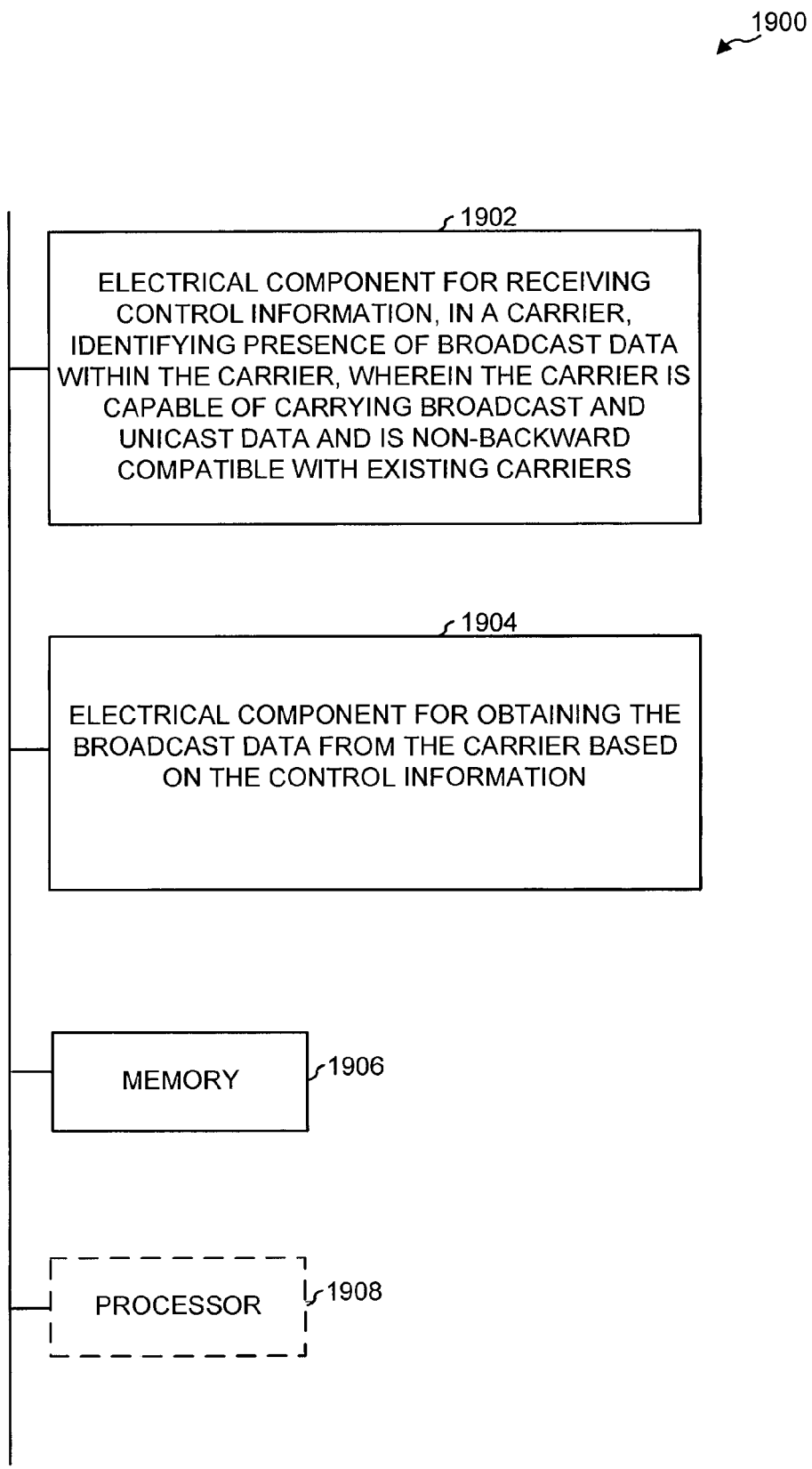
FIG. 19 is a block diagram representation of a portion of a wireless communication apparatus that, for example, may embody or be utilized with the user equipment of FIG. 1

Referring to FIG. 19, a portion of a wireless communication apparatus 1900 comprising electrical component 1902 for receiving control information of a carrier, wherein the control information identifies presence of broadcast data within the carrier, wherein the carrier is capable of carrying data traffic including the broadcast data and unicast data and comprises a carrier type that is non-backward compatible with existing carriers. Additionally, apparatus 1900 includes electrical component 1904 for obtaining the broadcast data and unicast data from the carrier based on the control information.

The apparatus 1900 also includes memory 1906 within which the electrical components 1902 and 1904 may be stored. Additionally or alternatively, memory 1906 can include instructions for executing electrical components 1902 and 1904, parameters related to electrical components 1902 and 1904, and/or the like.

Alternatively, or in addition, apparatus 1900 can include a processor 1908, which may include one or more processor modules, and which retains instructions for executing functions associated with electrical components 1902 and 1904, or that executes instructions defined by electrical components 1902 and 1904. While shown as being external to processor 1908, it is to be understood that one or more of electrical components 1902 and 1904 can exist within processor 1908.

Thus, the apparatus 1900 may further implement various techniques described herein. In one example, the apparatus 1900 can include a UE 804 (FIG. 8) to perform the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of supporting multi-media broadcast services in a wireless communication system, comprising:
generating a carrier capable of carrying data traffic including broadcast data and unicast data, wherein the carrier comprises a carrier type that is non-backward compatible with existing carriers and where a common reference signal is not included within one or more subframes that include unicast data;
carrying the broadcast data in at least one subframe of a plurality of subframes in the carrier;
providing control information in the carrier at least for the unicast data associated with the at least one subframe; and
transmitting the carrier.

2. The method of claim 1, wherein generating the carrier further comprises including a plurality of Multicast/Broadcast over a Single Frequency Network (MBSFN) subframes within each radio frame of a set of radio frames for transmission in a repeating interval, each MBSFN subframe comprising at least one but not both of a Multimedia Broadcast Multicast Service (MBMS) resource or a non-MBMS resource.

3. The method of claim 2, wherein providing control information further comprises providing cross-subframe, multi-subframe, or cross-carrier uplink (UL) scheduling information.

4. The method of claim 1, wherein the unicast data is for uplink transmission and the association of the unicast data with the at least one subframe is based on a hybrid automatic repeat/request timing relationship for the uplink transmission.

5. The method of claim 1, further comprising providing control information indicating a release of semi-persistent schedule for a user equipment in the at least one subframe.

6. The method of claim 1, further comprising transmitting a multicast control channel change notification message via a control channel for Multimedia Broadcast Multicast Service (MBMS).

7. The method of claim 1, wherein generating the carrier further comprises including a plurality of Multicast/Broadcast over a Single Frequency Network (MBSFN) subframes within each radio frame of a set of radio frames for transmission in a repeating interval, each MBSFN subframe comprising both a Multimedia Broadcast Multicast Service (MBMS) resource and a non-MBMS resource across a frequency domain of the MBSFN subframe, and wherein providing control information further comprises positioning the control information in the non-MBMS resource.

8. The method of claim 7, wherein generating the carrier including the plurality of MBSFN subframes each having the non-MBMS resource further comprises localizing the non-MBMS resource within each respective MBSFN subframe, or distributing the non-MBMS resource within each respective MBSFN subframe, or a combination of both.

9. The method of claim 7, wherein generating the carrier including the plurality of MBSFN subframes each having the non-MBMS resource and the MBMS resource further comprises including a guard band between the non-MBMS resource and the MBMS resource.

10. The method of claim 7, wherein generating the carrier further comprises providing the broadcast data in a Physical Multicast Channel (PMCH), and wherein providing control information further comprises indicating at least one of a PMCH bandwidth or a PMCH location.

11. The method of claim 10, wherein providing the broadcast data in the PMCH further comprises locating the PMCH in each respective MBSFN subframe in one of a fixed location, a semi-static location, or a dynamic location.

12. The method of claim 11, further comprising coordinating the semi-static location and the dynamic location of each PMCH for each subframe via backhaul signaling.

13. The method of claim 10, wherein indicating at least one of the PMCH bandwidth or the PMCH location further comprises indicating the at least one of the PMCH bandwidth or the PMCH location in a control channel.

14. The method of claim 7, wherein generating the carrier further comprises providing the broadcast data in a Physical Multicast Channel (PMCH) having a first cyclic prefix (CP) and a first tone spacing, and providing each non-MBMS resource of each MBSFN subframe with a second CP and a second tone spacing, wherein the first CP and the second CP comprise a same CP value, and wherein the first tone spacing and the second tone spacing comprise a same tone spacing value.

15. The method of claim 1, further comprising indicating at least one of a cyclic prefix (CP) type and a tone spacing for a set of subframes for at least one user equipment, where the indicated at least one of the CP type and the tone spacing is different from that of a subframe not belonging to the set of subframes.

16. The method of claim 1, further comprising determining a first bandwidth for the broadcast data in a first subframe and determining a second bandwidth, different from the first bandwidth, for the broadcast data in a second subframe.

17. The method of claim 7, wherein generating the carrier further comprises providing the broadcast data in a Physical Multicast Channel (PMCH) having a first cyclic prefix (CP) and a first tone spacing, and providing each non-MBMS resource of each MBSFN subframe with a second CP and a second tone spacing, wherein the first CP and the second CP comprise a different CP value, or the first tone spacing and the second tone spacing comprise a different tone spacing value, or a combination of both.

18. The method of claim 1, wherein generating the carrier further comprises including a plurality of Multicast/Broadcast over a Single Frequency Network (MBSFN) subframes within each radio frame of a set of radio frames for transmission in a repeating interval, at least one MBSFN subframe comprising both a Multimedia Broadcast Multicast Service (MBMS) resource and a non-MBMS resource across a time domain of the at least one MBSFN subframe, and wherein providing control information further comprises positioning the control information in the non-MBMS resource.

19. The method of claim 18, wherein generating the at least one MBSFN subframe including both the MBMS resource and the non-MBMS resource further comprises generating when the at least one MBSFN subframe further includes a Common Reference Signal (CRS) or a DeModulation-Reference Signal (DM-RS).

20. The method of claim 18, wherein generating the carrier further comprises providing the broadcast data in a Physical Multicast Channel (PMCH) defined by each MBMS resource, the PMCH having a first cyclic prefix (CP) and a first tone spacing, and providing each corresponding non-MBMS resource with a second CP and a second tone spacing, wherein at least one of the first CP and the second CP, or the first tone spacing and the second tone spacing, comprise a different value.

21. The method of claim 1, wherein generating the carrier of the carrier type comprises generating an extension carrier.

22. The method of claim 1, wherein generating the carrier of the carrier type comprises generating an extension carrier comprising a standalone carrier.

23. An apparatus for supporting multi-media broadcast services in a wireless communication system, comprising:
  at least one processor; and
  a memory coupled to the at least one processor;
  wherein the at least one processor is configured to:
    generate a carrier capable of carrying data traffic including broadcast data and unicast data, wherein the carrier comprises a carrier type that is non-backward compatible with existing carriers and where a common reference signal is not included within one or more subframes that include unicast data;
    carry the broadcast data in at least one subframe of a plurality of subframes in the carrier;
    provide control information in the carrier at least for the unicast data associated with the at least one subframe; and
    transmit the carrier.

24. The apparatus of claim 23, wherein the at least one processor configured to generate the carrier is further configured to include a plurality of Multicast/Broadcast over a Single Frequency Network (MBSFN) subframes within each radio frame of a set of radio frames for transmission in a repeating interval, each MBSFN subframe comprising at least one but not both of a Multimedia Broadcast Multicast Service (MBMS) resource or a non-MBMS resource.

25. The apparatus of claim 24, wherein the at least one processor configured to provide control information is further configured to provide cross-subframe, multi-subframe, or cross-carrier uplink (UL) scheduling information.

26. The apparatus of claim 23, wherein the unicast data is for uplink transmission and the association of the unicast data with the at least one subframe is based on a hybrid automatic repeat/request timing relationship for the uplink transmission.

27. The apparatus of claim 23, wherein the at least one processor is further configured to provide control information indicating a release of semi-persistent schedule for a user equipment in the at least one subframe.

28. The apparatus of claim 23, wherein the at least one processor is further configured to transmit a multicast control channel change notification message via a control channel for Multimedia Broadcast Multicast Service (MBMS).

29. The apparatus of claim 23, wherein the at least one processor configured to generate the carrier is further configured to include a plurality of Multicast/Broadcast over a Single Frequency Network (MBSFN) subframes within each radio frame of a set of radio frames for transmission in a repeating interval, each MBSFN subframe comprising both a Multimedia Broadcast Multicast Service (MBMS) resource and a non-MBMS resource across a frequency domain of the MBSFN subframe, and wherein providing control information further comprises positioning the control information in the non-MBMS resource.

30. The apparatus of claim 29, wherein the at least one processor configured to generate the carrier including the plurality of MBSFN subframes each having the non-MBMS resource is further configured to localize the non-MBMS resource within each respective MBSFN subframe, or distributing the non-MBMS resource within each respective MBSFN subframe, or a combination of both.

31. The apparatus of claim 29, wherein the at least one processor configured to generate the carrier including the plurality of MBSFN subframes each having the non-MBMS resource and the MBMS resource is further configured to include a guard band between the non-MBMS resource and the MBMS resource.

32. The apparatus of claim 29, wherein the at least one processor configured to generate the carrier is further configured to provide the broadcast data in a Physical Multicast Channel (PMCH), and wherein the at least one processor configured to provide control information is further configured to indicate at least one of a PMCH bandwidth or a PMCH location.

33. The apparatus of claim 32, wherein the at least one processor configured to provide the broadcast data in the PMCH is further configured to locate the PMCH in each respective MBSFN subframe in one of a fixed location, a semi-static location, or a dynamic location.

34. The apparatus of claim 33, wherein the at least one processor is further configured to coordinate the semi-static location and the dynamic location of each PMCH for each subframe via backhaul signaling.

35. The apparatus of claim 32, wherein the at least one processor configured to indicate at least one of the PMCH bandwidth or the PMCH location is further configured to indicate the at least one of the PMCH bandwidth or the PMCH location in a control channel.

36. The apparatus of claim 29, wherein the at least one processor configured to generate the carrier is further configured to provide the broadcast data in a Physical Multicast Channel (PMCH) having a first cyclic prefix (CP) and a first tone spacing, and providing each non-MBMS resource of each MBSFN subframe with a second CP and a second tone spacing, wherein the first CP and the second CP comprise a same CP value, and wherein the first tone spacing and the second tone spacing comprise a same tone spacing value.

37. The apparatus of claim 23, wherein the at least one processor is further configured to indicate at least one of a cyclic prefix (CP) type and a tone spacing for a set of subframes for at least one user equipment, where the indicated at least one of the CP type and the tone spacing is different from that of a subframe not belonging to the set of subframes.

38. The apparatus of claim 23, wherein the at least one processor is further configured to determine a first bandwidth for the broadcast data in a first subframe and determine a second bandwidth, different from the first bandwidth, for the broadcast data in a second subframe.

39. The apparatus of claim 29, wherein the at least one processor configured to generate the carrier is further configured to provide the broadcast data in a Physical Multicast Channel (PMCH) having a first cyclic prefix (CP) and a first tone spacing, and provide each non-MBMS resource of each MBSFN subframe with a second CP and a second tone spacing, wherein the first CP and the second CP comprise a different CP value, or the first tone spacing and the second tone spacing comprise a different tone spacing value, or a combination of both.

40. The apparatus of claim 23, wherein the at least one processor configured to generate the carrier is further configured to include a plurality of Multicast/Broadcast over a Single Frequency Network (MBSFN) subframes within each radio frame of a set of radio frames for transmission in a repeating interval, at least one MBSFN subframe comprising both a Multimedia Broadcast Multicast Service (MBMS) resource and a non-MBMS resource across a time domain of the at least one MBSFN subframe, and wherein the at least one processor configured to provide control information is further configured to position the control information in the non-MBMS resource.

41. The apparatus of claim 40, wherein the at least one processor configured to generate the at least one MBSFN subframe including both the MBMS resource and the non-MBMS resource is further configured to generate when the at least one MBSFN subframe includes a Common Reference Signal (CRS) or a DeModulation-Reference Signal (DM-RS).

42. The apparatus of claim 40, wherein the at least one processor configured to generate the carrier is further configured to provide the broadcast data in a Physical Multicast Channel (PMCH) defined by each MBMS resource, the PMCH having a first cyclic prefix (CP) and a first tone spacing, and provide each corresponding non-MBMS resource with a second CP and a second tone spacing, wherein at least one of the first CP and the second CP, or the first tone spacing and the second tone spacing, comprise a different value.

43. The apparatus of claim 23, wherein the at least one processor configured to generate the carrier of the carrier type is further configured to generate an extension carrier associated with a backward compatible carrier.

44. The apparatus of claim 23, wherein the at least one processor configured to generate the carrier of the carrier type is further configured to generate an extension carrier comprising a standalone carrier.

45. A non-transitory computer-readable medium for supporting multi-media broadcast services in a wireless communication system comprising code for:
   generating a carrier capable of carrying data traffic including broadcast data and unicast data, wherein the carrier comprises a carrier type that is non-backward compatible with existing carriers and where a common reference signal is not included within one or more subframes that include unicast data;
   carrying the broadcast data in at least one subframe of a plurality of subframes in the carrier;
   providing control information in the carrier at least for the unicast data associated with the at least one subframe; and
   transmitting the carrier.

46. The non-transitory computer-readable medium of claim 45, wherein the code for generating the carrier further comprises code for including a plurality of Multicast/Broadcast over a Single Frequency Network (MBSFN) subframes within each radio frame of a set of radio frames for transmission in a repeating interval, each MBSFN subframe comprising at least one but not both of a Multimedia Broadcast Multicast Service (MBMS) resource or a non-MBMS resource.

47. The non-transitory computer-readable medium of claim 46, wherein the code for providing control information further comprises code for providing cross-subframe, multi-subframe, or cross-carrier uplink (UL) scheduling information.

48. The non-transitory computer-readable medium of claim 45, wherein the unicast data is for uplink transmission and the association of the unicast data with the at least one subframe is based on a hybrid automatic repeat/request timing relationship for the uplink transmission.

49. The non-transitory computer-readable medium of claim 45, further comprising code for providing control information indicating a release of semi-persistent schedule for a user equipment in the at least one subframe.

50. The non-transitory computer-readable medium of claim 45, further comprising code for transmitting a multicast control channel change notification message via a control channel for Multimedia Broadcast Multicast Service (MBMS).

51. The non-transitory computer-readable medium of claim 45, wherein the code for generating the carrier further comprises code for including a plurality of Multicast/Broadcast over a Single Frequency Network (MBSFN) subframes within each radio frame of a set of radio frames for transmission in a repeating interval, each MBSFN subframe comprising both a Multimedia Broadcast Multicast Service (MBMS) resource and a non-MBMS resource across a frequency domain of the MBSFN subframe, and wherein code for providing control information further comprises code for positioning the control information in the non-MBMS resource.

52. The non-transitory computer-readable medium of claim 51, wherein the code for generating the carrier including the plurality of MBSFN subframes each having the non-MBMS resource further comprises code for localizing the non-MBMS resource within each respective MBSFN subframe, or distributing the non-MBMS resource within each respective MBSFN subframe, or a combination of both.

53. The non-transitory computer-readable medium of claim 51, wherein the code for generating the carrier including the plurality of MBSFN subframes each having the non-MBMS resource and the MBMS resource further comprises code for including a guard band between the non-MBMS resource and the MBMS resource.

54. The non-transitory computer-readable medium of claim 51, wherein the code for generating the carrier further comprises code for providing the broadcast data in a Physical Multicast Channel (PMCH), and wherein code for providing control information further comprises code for indicating at least one of a PMCH bandwidth or a PMCH location.

55. The non-transitory computer-readable medium of claim 54, wherein the code for providing the broadcast data in the PMCH further comprises code for locating the PMCH in each respective MBSFN subframe in one of a fixed location, a semi-static location, or a dynamic location.

56. The non-transitory computer-readable medium of claim 55, further comprising code for coordinating the semi-static location and the dynamic location of each PMCH for each subframe via backhaul signaling.

57. The non-transitory computer-readable medium of claim 54, wherein the code for indicating at least one of the PMCH bandwidth or the PMCH location further comprises code for indicating the at least one of the PMCH bandwidth or the PMCH location in a control channel.

58. The non-transitory computer-readable medium of claim 51, wherein the code for generating the carrier further comprises code for providing the broadcast data in a Physical Multicast Channel (PMCH) having a first cyclic prefix (CP) and a first tone spacing, and code for providing each non-MBMS resource of each MBSFN subframe with a second CP and a second tone spacing, wherein the first CP and the second CP comprise a same CP value, and wherein the first tone spacing and the second tone spacing comprise a same tone spacing value.

59. The non-transitory computer-readable medium of claim 45, further comprising code for indicating at least one of a cyclic prefix (CP) type and a tone spacing for a set of subframes for at least one user equipment, where the indicated at least one of the CP type and the tone spacing is different from that of a subframe not belonging to the set of subframes.

60. The non-transitory computer-readable medium of claim 45, further comprising code for determining a first bandwidth for the broadcast data in a first subframe and determining a second bandwidth, different from the first bandwidth, for the broadcast data in a second subframe.

61. The non-transitory computer-readable medium of claim 51, wherein the code for generating the carrier further comprises code for providing the broadcast data in a Physical Multicast Channel (PMCH) having a first cyclic prefix (CP) and a first tone spacing, and code for providing each non- MBMS resource of each MBSFN subframe with a second CP and a second tone spacing, wherein the first CP and the second CP comprise a different CP value, or the first tone spacing and the second tone spacing comprise a different tone spacing value, or a combination of both.

62. The non-transitory computer-readable medium of claim 45, wherein the code for generating the carrier further comprises code for including a plurality of Multicast/Broadcast over a Single Frequency Network (MBSFN) subframes within each radio frame of a set of radio frames for transmission in a repeating interval, at least one MBSFN subframe comprising both a Multimedia Broadcast Multicast Service (MBMS) resource and a non-MBMS resource across a time domain of the at least one MBSFN subframe, and wherein code for providing control information further comprises code for positioning the control information in the non-MBMS resource.

63. The non-transitory computer-readable medium of claim 62, wherein the code for generating the at least one MBSFN subframe including both the MBMS resource and the non-MBMS resource further comprises code for generating when the at least one MBSFN subframe further includes a Common Reference Signal (CRS) or a DeModulation-Reference Signal (DM-RS).

64. The non-transitory computer-readable medium of claim 62, wherein the code for generating the carrier further comprises code for providing the broadcast data in a Physical Multicast Channel (PMCH) defined by each MBMS resource, the PMCH having a first cyclic prefix (CP) and a first tone spacing, and code for providing each corresponding non-MBMS resource with a second CP and a second tone spacing, wherein at least one of the first CP and the second CP, or the first tone spacing and the second tone spacing, comprise a different value.

65. The non-transitory computer-readable medium of claim 45, wherein the code for generating the carrier of the carrier type further comprises code for generating an extension carrier associated with a backward compatible carrier.

66. The non-transitory computer-readable medium of claim 45, wherein the code for generating the carrier of the carrier type further comprises code for generating an extension carrier comprising a standalone carrier.

67. An apparatus for supporting multi-media broadcast services in a wireless communication system, comprising:
means for generating a carrier capable of carrying data traffic including broadcast data and unicast data, wherein the carrier comprises a carrier type that is non-backward compatible with existing carriers and where a common reference signal is not included within one or more subframes that include unicast data;
means for carrying the broadcast data in at least one subframe of a plurality of subframes in the carrier;
means for providing control information in the carrier at least for the unicast data associated with the at least one subframe; and
means for transmitting the carrier.

68. The apparatus of claim 67, wherein the means for generating the carrier includes a plurality of Multicast/Broadcast over a Single Frequency Network (MBSFN) subframes within each radio frame of a set of radio frames for transmission in a repeating interval, each MBSFN subframe comprising at least one but not both of a Multimedia Broadcast Multicast Service (MBMS) resource or a non-MBMS resource.

69. The apparatus of claim 68, wherein the means for providing control information provides cross-subframe, multi-subframe, or cross-carrier uplink (UL) scheduling information.

70. The apparatus of claim 67, wherein the unicast data is for uplink transmission and the association of the unicast data with the at least one subframe is based on a hybrid ARQ timing relationship for the uplink transmission.

71. The apparatus of claim 67, wherein the control information includes a release of semi-persistent schedule for a UE in the at least one subframe.

72. The apparatus of claim 67, wherein the means for transmitting transmits an MCCH change notification message via a control channel for Multimedia Broadcast Multicast Service (MBMS).

73. The apparatus of claim 67, wherein the means for generating the carrier includes a plurality of Multicast/Broadcast over a Single Frequency Network (MBSFN) subframes within each radio frame of a set of radio frames for transmission in a repeating interval, each MBSFN subframe comprising both a Multimedia Broadcast Multicast Service (MBMS) resource and a non-MBMS resource across a frequency domain of the MBSFN subframe, and wherein the control information includes information for positioning the control information in the non-MBMS resource.

74. The apparatus of claim 73, wherein the means for generating the carrier localizes the non-MBMS resource within each respective MBSFN subframe, or distributes the non-MBMS resource within each respective MBSFN subframe, or a combination of both.

75. The apparatus of claim 73, wherein the means for generating the carrier includes a guard band between the non-MBMS resource and the MBMS resource.

76. The apparatus of claim 73, wherein the means for generating the carrier provides the broadcast data in a Physical Multicast Channel (PMCH), and wherein the control information includes information for indicating at least one of a PMCH bandwidth or a PMCH location.

77. The apparatus of claim 76, wherein the means for generating the carrier locates locating the PMCH in each respective MBSFN subframe in one of a fixed location, a semi-static location, or a dynamic location.

78. The apparatus of claim 77, wherein the means for generating the carrier coordinates the semi-static location and the dynamic location of each PMCH for each subframe via backhaul signaling.

79. The apparatus of claim 76, wherein the means for providing the control information indicates at least one of the PMCH bandwidth or the PMCH location in a control channel.

80. The apparatus of claim 73, wherein the means for generating the carrier provides the broadcast data in a Physical Multicast Channel (PMCH) having a first cyclic prefix (CP) and a first tone spacing, and provides each non-MBMS resource of each MBSFN subframe with a second CP and a second tone spacing, wherein the first CP and the second CP comprise a same CP value, and wherein the first tone spacing and the second tone spacing comprise a same tone spacing value.

81. The apparatus of claim 67, wherein the means for generating the carrier indicates at least one of a cyclic prefix (CP) type and a tone spacing for a set of subframes for at least one user equipment, where the indicated at least one of the CP type and the tone spacing is different from that of a subframe not belonging to the set of subframes.

82. The apparatus of claim 67, wherein the means for generating the carrier determines a first bandwidth for the broadcast data in a first subframe and determines a second bandwidth, different from the first bandwidth, for the broadcast data in a second subframe.

83. The apparatus of claim 73, wherein the means for generating the carrier provides the broadcast data in a Physical Multicast Channel (PMCH) having a first cyclic prefix (CP) and a first tone spacing, and provides each non-MBMS resource of each MBSFN subframe with a second CP and a second tone spacing, wherein the first CP and the second CP comprise a different CP value, or the first tone spacing and the second tone spacing comprise a different tone spacing value, or a combination of both.

84. The apparatus of claim 67, wherein the means for generating the carrier includes a plurality of Multicast/Broadcast over a Single Frequency Network (MBSFN) subframes within each radio frame of a set of radio frames for transmission in a repeating interval, at least one MBSFN subframe comprising both a Multimedia Broadcast Multicast Service (MBMS) resource and a non-MBMS resource across a time domain of the at least one MBSFN subframe, and wherein the control information includes information for positioning the control information in the non-MBMS resource.

85. The apparatus of claim 84, wherein the means for generating generates the at least one MBSFN subframe including both the MBMS resource and the non-MBMS resource when the at least one MBSFN subframe further includes a Common Reference Signal (CRS) or a DeModulation-Reference Signal (DM-RS).

86. The apparatus of claim 84, wherein the means for generating the carrier provides the broadcast data in a Physical Multicast Channel (PMCH) defined by each MBMS resource, the PMCH having a first cyclic prefix (CP) and a first tone spacing, and provides each corresponding non-MBMS resource with a second CP and a second tone spacing, wherein at least one of the first CP and the second CP, or the first tone spacing and the second tone spacing, comprise a different value.

87. The apparatus of claim 67, wherein means for generating the carrier generates an extension carrier associated with a backward compatible carrier.

88. The apparatus of claim 67, wherein means for generating the carrier generates an extension carrier comprising a standalone carrier

* * * * *

UNITED STATES PATENT AND TRADEMARK OFFICE
CERTIFICATE OF CORRECTION

| | | |
|---|---|---|
| PATENT NO. | : 9,131,351 B2 | Page 1 of 1 |
| APPLICATION NO. | : 13/797543 | |
| DATED | : September 8, 2015 | |
| INVENTOR(S) | : Durga Prasad Malladi | |

It is certified that error appears in the above-identified patent and that said Letters Patent is hereby corrected as shown below:

On the Title Page:

Assignee reads:

(73) Assignee: QUALCOMM INCORPORATED, San Diego, CA (US)

Assignee should read:

(73) Assignee: QUALCOMM Incorporated, San Diego, CA (US)

Signed and Sealed this
Twenty-eighth Day of June, 2016

Michelle K. Lee
*Director of the United States Patent and Trademark Office*